US012804740B2

(12) United States Patent
Gundavelli et al.

(10) Patent No.: US 12,804,740 B2
(45) Date of Patent: Nov. 17, 2026

(54) PROVIDING PER-TENANT USER EQUIPMENT ROUTE SELECTION POLICIES IN A MULTI-TENANT ENVIRONMENT INVOLVING SHARED WIRELESS WIDE AREA ACCESS NETWORK EQUIPMENT

(71) Applicant: Cisco Technology, Inc., San Jose, CA (US)

(72) Inventors: Srinath Gundavelli, San Jose, CA (US); Thirupathi Reddy Katam, Mountain House, CA (US); Ravi Kiran Guntupalli, Cumming, GA (US); Vimal Srivastava, Kannamangala (IN); Pradeep K. Kathail, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 276 days.

(21) Appl. No.: 18/644,416

(22) Filed: Apr. 24, 2024

(65) Prior Publication Data

US 2025/0338326 A1 Oct. 30, 2025

(51) Int. Cl.
*H04W 76/12* (2018.01)
*H04W 12/06* (2021.01)
(Continued)

(52) U.S. Cl.
CPC ........... *H04W 76/12* (2018.02); *H04W 12/06* (2013.01); *H04W 40/22* (2013.01); *H04W 60/04* (2013.01); *H04W 84/12* (2013.01)

(58) Field of Classification Search
CPC ..... H04W 76/12; H04W 12/06; H04W 40/22; H04W 60/04
(Continued)

(56) References Cited

U.S. PATENT DOCUMENTS 8,681,695 B1 3/2014 Krishnan
10,791,431 B2 9/2020 Livanos et al.
(Continued)

FOREIGN PATENT DOCUMENTS

EP 4255019 A1 10/2023
KR 20210038225 A 4/2021
(Continued)

OTHER PUBLICATIONS

3GPP: "3rd Generation Partnership Project, Technical Specification Group Core Network and Terminals, 5G System, UE Policy Control Service, Stage 3(Release 18)", 3GPP TS 29.525 V18.5.0, Mar. 2024, 104 pages.

(Continued)

*Primary Examiner* — Faisal Choudhury
(74) *Attorney, Agent, or Firm* — Edell, Shapiro & Finnan, LLC

(57) ABSTRACT

Provided herein are techniques to facilitate on-premise wireless wide area access network equipment sharing in a multi-tenant environment. In one example, a method may include obtaining, by a device, a first route selection policy envelope for a first tenant of the plurality of tenants in which the first route selection policy envelope includes a plurality of route selection rules associated with the first tenant. The method may further include upon obtaining a first data packet from a first wireless local area network access point of the first tenant, identifying, based on first data packet, a particular route selection rule of the first route selection policy envelope for the first tenant and establishing a protocol data unit (PDU) session for the first tenant with the mobile core network.

20 Claims, 8 Drawing Sheets

(51) Int. Cl.
*H04W 40/22* (2009.01)
*H04W 60/04* (2009.01)
*H04W 84/12* (2009.01)
(58) Field of Classification Search
USPC .......................................................... 370/329
See application file for complete search history.

(56) References Cited

U.S. PATENT DOCUMENTS

| | | | |
|---|---|---|---|
| 11,032,733 B2 | 6/2021 | Gundavelli et al. | |
| 12,058,514 B2 | 8/2024 | Bestermann et al. | |
| 2013/0139221 A1 | 5/2013 | Gundavelli et al. | |
| 2014/0254500 A1 | 9/2014 | Alavudin | |
| 2015/0350912 A1 | 12/2015 | Head et al. | |
| 2016/0337904 A1 | 11/2016 | Hsu et al. | |
| 2017/0208032 A1 | 7/2017 | Cox | |
| 2017/0332296 A1 | 11/2017 | Nilsson et al. | |
| 2018/0262465 A1* | 9/2018 | Määttanen | H04W 12/03 |
| 2019/0150219 A1 | 5/2019 | Wang et al. | |
| 2019/0306036 A1 | 10/2019 | Boutros et al. | |
| 2020/0092790 A1* | 3/2020 | Salkintzis | H04W 76/10 |
| 2021/0099871 A1 | 4/2021 | Bhatnagar et al. | |
| 2021/0409948 A1 | 12/2021 | Tomici et al. | |
| 2022/0039177 A1 | 2/2022 | Talebi Fard et al. | |
| 2022/0070625 A1 | 3/2022 | Miklos et al. | |
| 2022/0225082 A1 | 7/2022 | Zhang et al. | |
| 2022/0345985 A1* | 10/2022 | Erta | H04L 45/24 |
| 2022/0361272 A1 | 11/2022 | Sugawara | |
| 2022/0377819 A1 | 11/2022 | Zhou et al. | |
| 2023/0006889 A1 | 1/2023 | Thyagaturu et al. | |
| 2023/0017455 A1 | 1/2023 | Kamaladinni et al. | |
| 2023/0209656 A1 | 6/2023 | Liao et al. | |
| 2023/0262562 A1* | 8/2023 | Manithara Vamanan | H04W 24/08 370/331 |
| 2023/0309159 A1 | 9/2023 | Zhang et al. | |
| 2024/0196216 A1* | 6/2024 | Chen | H04W 12/08 |
| 2024/0267323 A1* | 8/2024 | Amend | H04L 45/306 |
| 2024/0314568 A1 | 9/2024 | Vemuri | |
| 2025/0185085 A1 | 6/2025 | Gundavelli et al. | |
| 2025/0310747 A1 | 10/2025 | Minokuchi et al. | |
| 2025/0351209 A1 | 11/2025 | Gundavelli et al. | |

FOREIGN PATENT DOCUMENTS

| | | |
|---|---|---|
| WO | 2019137547 A1 | 7/2019 |
| WO | 2019196860 A1 | 10/2019 |
| WO | 2020030248 A1 | 2/2020 |
| WO | 2023064655 A1 | 4/2023 |
| WO | 202321512 A1 | 11/2023 |
| WO | 2024039843 A1 | 2/2024 |

OTHER PUBLICATIONS

3GPP: "3rd Generation Partnership Project, Technical Specification Group Core Network and Terminals, User Equipment (UE) policies for 5G System (5GS), Stage 3(Release 18)", 3GPP TS 24.526 V18.6.0, Mar. 2024, 70 pages.
3GPP: "3rd Generation Partnership Project, Technical Specification Group Services and System Aspects, Policy and Charging Control Framework for the 5G System (5GS), Stage 2 (Release 17)", 3GPP TS 23.503 V17.11.0, Mar. 2024, 142 pages.
3GPP: "3rd Generation Partnership Project, Technical Specification Group Services and System Aspects, Policy and Charging Control Framework for the 5G System (5GS), Stage 2 (Release 18)", 3GPP TS 23.503, V18.3.0, Sep. 2023, 176 pages.
3GPP: "3rd Generation Partnership Project, Technical Specification Group Services and System Aspects, Policy and Charging Control Framework for the 5G System (5GS), Stage 2 (Release 18)", 3GPP TS 23.503 V18.5.0, Mar. 2024, 181 pages.
3GPP: "3rd Generation Partnership Project, Technical Specification Group Services and System Aspects, Procedures for the 5G System (5GS), Stage 2(Release 18)", 3GPP TS 23.502 V18.3.0, Sep. 2023, 889 pages.
3GPP: "3rd Generation Partnership Project, Technical Specification Group Services and System Aspects, Procedures for the 5G System (5GS), Stage 2(Release 18)", 3GPP TS 23.502 V18.5.0, Mar. 2024, 914 pages.
3GPP: "3rd Generation Partnership Project, Technical Specification Group Services and System Aspects, System Architecture for the 5G System (5GS), Stage 2(Release 18)", 3GPP TS 23.501 V18.3.0, Sep. 2023, 686 pages.
Cisco: "8.5 EoGRE Tunneling Deployment Guide", Revised on Jun. 15, 2018, retrieved from https://www.cisco.com/c/en/us/td/docs/wireless/controller/technotes/8-5/b_8_5_EoGRE_Tunneling_Deployment_Guide.html, 32 pages.
Dekok A., "The Network Access Identifier," RFC: 7542, Internet Engineering Task Force, Geneva, Switzerland, May 1, 2015, XP015104600, 30 pages.
ETSI: "5G, 5G System, UE Policy Control Service, Stage 3 (3GPP TS 29.525 version 17.9.0 Release 17)", ETSI TS 129 525 V17.9.0, Jan. 2023, 74 pages.
ETSI: "5G, Policy and Charging Control Framework for the 5G System (5GS), Stage 2 (3GPP TS 23.503 version 17.10.0 Release 17)", ETSI TS 123 503, V17.10.0, Sep. 2023, 150 pages.
ETSI: "5G, Procedures for the 5G System (5GS) (3GPP TS 23.502 version 17.10.0 Release 17)", ETSI TS 123 502 V17.10.0, Sep. 2023, 753 Pages.
ETSI: "5G, Procedures for the 5G System (5GS) (3GPP TS 23.502 version 17.12.0 Release 17)", ETSI TS 123 502 V17.12.0, Apr. 2024, 754 pages.
ETSI: "5G, Study on User-centric Identifiers and Authentication (3GPP TR 22.904 version 17.0.0 Release 17)", ETSI TR 122 904 V17.0.0, Apr. 2022, 21 pages.
ETSI: "5G, System Architecture for the 5G System (5GS) (3GPP TS 23.501 version 17.10.0 Release 17)", ETSI TS 123 501 V17.10.0, Sep. 2023, 575 Pages.
ETSI: "5G, User Equipment (UE) Policies for 5G System (5GS), Stage 3 (3GPP TS 24.526 version 17.8.0 Release 17)", ETSI TS 124 526 V17.8.0, Jan. 2023, 59 pages.
ETSI: "Digital Cellular Telecommunications System (Phase 2+) (GSM), Universal Mobile Telecommunications System (UMTS), LTE, 3GPP System Architecture Evolution (SAE), Security Architecture (3GPP TS 33.401 version 17.4.0 Release 17)", ETSI TS 133 401, V17.4.0, Jul. 2023, 178 pages.
Gupta B., "IEEE 802.11 and 3GPP 5G System Interworking", doc.: IEEE 802.11-20/1579r0, Tutorial at IEEE 802 Plenary, Oct. 6, 2020, 40 pages.
Interdigital Inc (Moderator): "New Study on User Identities and Authentication Architecture", TSG SA Meeting #102, SP-231804, Edinburgh, Scotland, Dec. 11-15, 2023, 6 pages.
Nayarasi., "802.11 Mgmt : Action Frames", mrn-cciew, Oct. 9, 2014, retrieved from https://mrncciew.com/2014/10/09/802-11-mgmt-action-frames/ on Apr. 4, 2024, 18 Pages.
Nayarasi., "CWAP 802.11—Probe Request/Response", mrn-cciew, Oct. 27, 2014, retrieved from https://mrncciew.com/2014/10/27/cwap-802-11-probe-requestresponse/ on Apr. 16, 2024, 25 Pages.
How I Wi-Fi: "802.11 Frame Types and Formats", retrieved from https://howiwifi.com/2020/07/13/802-11-frame-types-and-formats/ on Apr. 16, 2024, 45 Pages.
ETSI: "5G, Access to the 3GPP 5G Core Network (5GCN) via Non-3GPP Access Networks (3GPP TS 24.502 version 17.9.0 Release 17)", ETSI TS 124 502 V17.9.0, Jul. 2023, pp. 1-96.

* cited by examiner

PROVIDING PER-TENANT USER EQUIPMENT ROUTE SELECTION POLICIES IN A MULTI-TENANT ENVIRONMENT INVOLVING SHARED WIRELESS WIDE AREA ACCESS NETWORK EQUIPMENT

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. In particular, there is a desire to provide wireless network connectivity in different environments, such as public venue environments. However, it can be difficult and costly to provide seamless coverage for wireless wide area access networks, such as Third Generation Partnership Project (3GPP) Fifth Generation (5G) networks, in many public venue environments. Thus, new opportunities are presented for providing wireless connectivity for wireless devices in such environments.

DETAILED DESCRIPTION

Overview

Figure 1:
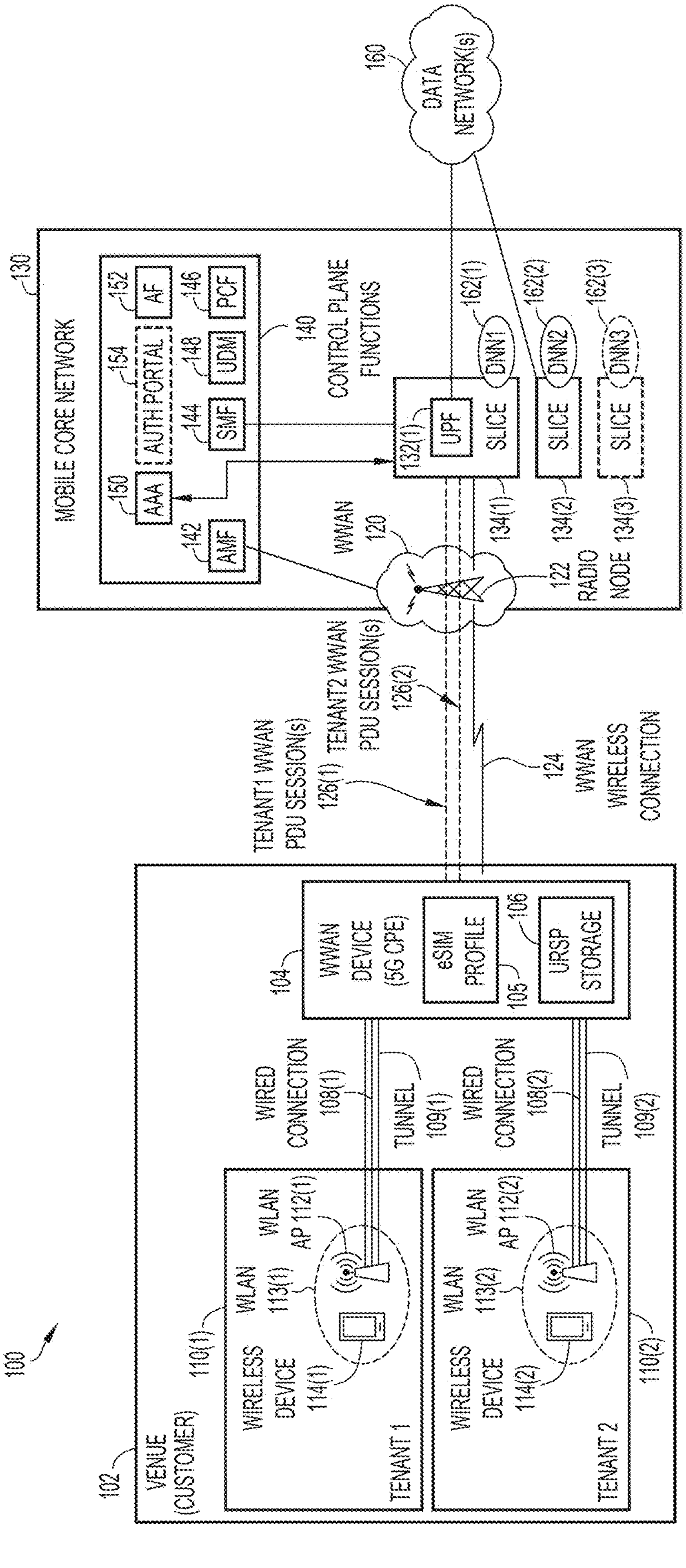
FIG. 1 illustrates a system that may facilitate providing per-tenant user equipment (UE) route selection policies (URSPs) in a multi-tenant environment involving shared wireless wide area access network equipment, according to an example embodiment.

Provided herein are techniques to facilitate on-premise wireless wide area access network equipment sharing in a multi-tenant environment. In accordance with embodiments herein, a system may provide communication services to each of multiple wired tenants via a shared Third Generation Partnership Project (3GPP) (e.g., Fourth Generation/Long Term Evolution (4G/LTE), Fifth Generation (5G) and/or next generation (nG)) customer premise equipment (CPE) device (e.g., router/gateway/node/apparatus/etc.), broadly referred to herein as a shared 3GPP/cellular gateway, a shared wireless wide area network (WWAN) on-premise device, a shared WWAN gateway device, a shared WWAN access device, or, more generally, WWAN device, or any variations thereof. The WWAN device can interface, via corresponding wired connections, with each of one or more wireless local area network (WLAN) access points (APs) for each of a given tenant of multiple tenants that may share the WWAN device and the WWAN device may provide cellular/wireless connectivity with one or more 3GPP (e.g., cellular) radio access networks (RANs) that interface with one or more mobile core networks.

Further, embodiments herein may facilitate providing corresponding user equipment (UE) route selection policies (URSPs), also referred to herein as URSP rules, for each tenant that may share the WWAN device such that one or more 5G/nG protocol data unit (PDU) sessions can be established for each tenant based on a URSP envelope containing one or more URSP rules for each tenant in which a particular PDU session can be established for a particular tenant based on identifying a particular URSP rule for the tenant via the tenant's URSP envelope.

In at least one embodiment, a computer-implemented method is provided that may include establishing a tunnel between a device and each of a plurality of wireless local area network (WLAN) access points (APs), wherein each WLAN AP of the plurality of WLAN APs is operated by each of a tenant of a plurality of tenants and wherein the device facilitates wireless connectivity with a wireless wide area network (WWAN) that interfaces with a mobile core network; obtaining, by the device, a first route selection policy envelope for a first tenant of the plurality of tenants, wherein the first route selection policy envelope includes a plurality of route selection rules associated with the first tenant; upon obtaining a first data packet from a first WLAN AP of the first tenant, identifying, based on first data packet, a particular route selection rule of the first route selection policy envelope for the first tenant; and establishing a protocol data unit (PDU) session for the first tenant with the mobile core network in accordance with the particular route selection rule

Example Embodiments

Mobile network operators are exploring new service offering opportunities leveraging wireless wide area (WWA) accesses, such as Third Generation Partnership Project (3GPP) Fifth Generation (5G) access, next Generation (nG), or, more broadly 3GPP cellular access. In a large public venue (LPV) environment, such as in a mall or shopping center, as an example only, a 5G/nG-capable router/gateway/node/device can be provided as a customer premise equipment (CPE), more generally referred to herein as an 'on-premise' device/equipment, in which such a wireless wide area network (WWAN) router/gateway/device may be considered a starting point for extending broadband connectivity services (e.g., wired broadband connectivity) to retail and enterprise network segments and may also facilitate wireless connectivity to a WWAN of a mobile network operator (MNO), such as a 3GPP 5G/nG radio access network (RAN) that interfaces with a mobile core network operated by an MNO.

However, in many public venue environments, such as shopping malls and multi-floor structures that include multiple tenants, deployment of dedicated a 5G/nG WWAN device for every tenant is not an option. For example, some locations for such structures may have poor indoor Radio Frequency (RF) coverage to 5G/nG cell towers. Further, the monetary expense of deploying a 5G/nG CPE device for each of multiple tenants may be cost prohibitive. However, in many such LPV environments, there exists wired connectivity, such as Ethernet wiring, which interconnects each tenant/location (e.g., each retailer) to a central or centralized wiring closet or location, at which network routers, etc. can be provided.

Thus, there is a service creation opportunity for 5G/nG wireless mobile network operators for extending connectivity services to tenants behind a 5G/nG-capable CPE/on-premise device in combination with wireless local area network (WLAN) (e.g., Wi-Fi®) and wired termination devices. Service creation opportunities may also be provided for wired service providers as well.

Some approaches provide for a 5G/nG CPE that can manage a tenant specific PDU session that allows for distinct charging and a secondary tenant specific authentication. However, what is missing for such approaches is tenant specific user equipment (UE) route selection policy (URSP) policy support. Such semantics of delivering multiple URSP policies (e.g., a different set of per-tenant URSP rules for each of multiple tenants) for a single subscriber/Subscriber Identity Module (SIM) are also missing in the current 3GPP architecture.

Utilization of URSP policies/rules is a strong feature of 3GPP that can be used by a UE to determine desired attributes for PDU session creation. For Release 19 of 3GPP standards, studies have been initiated to determine how to allow for the creation and utilization of user-specific identities behind a 5G UE/CPE/gateway/device in order for operators to provide enhanced user experience, optimized performance, and offer services to devices and users that are not part of an operator's 3GPP network. It is desired that a 3GPP-based system may be able to consider user specific settings when delivering services (e.g., communication/data services). While existing solutions in 3GPP standards involve providing URSP rules that are specific to a particular 5G/nG UE, there is currently no mechanism provided for providing URSP policies for different users/devices that are behind/interface with a 5G/nG UE or, for CPE environments, for users/devices connected to WLAN APs for each of one or more per-tenant WLANs that are connected to/behind/downstream from a 5G/nG CPE/gateway that is further connected (upstream) to a 3GPP/cellular RAN and mobile core network.

In accordance with embodiments herein, techniques are provided that may facilitate on-premise wireless wide area access network equipment sharing in a multi-tenant environment in which per-tenant URSPs, referred to herein as a per-tenant URSP envelope containing one or more URSP rules, can be provided for each tenant sharing the wireless wide area access network equipment that interfaces with a 3GPP cellular RAN/radio node and mobile core network.

Referring to FIG. 1, FIG. 1 illustrates a system 100 that may facilitate providing per-tenant URSPs in a multi-tenant environment involving shared wireless wide area access network equipment, according to an example embodiment. In at least one embodiment, system 100 may include a venue 102, such as a LPV (e.g., a mall, office complex, etc.), a wireless wide area (WWA) access network, referred to herein as a WWA network (WWAN) 120, that includes at least one radio node 122. A mobile core network 130 operated by a service provider (SP), also referred to interchangeably herein as a mobile network operator (MNO), may also be included in system 100.

Also shown in FIG. 1 are one or more data networks 160, such as the public Internet, an enterprise/private network (e.g., a business entity, a government entity, an education entity, etc. to serve enterprise purposes), an Internet Protocol (IP) Multimedia Subsystem (IMS), an Ethernet network/switching system, and/or the like.

In at least one embodiment, the Internet, an IMS, etc. may be associated with a data network name (DNN), such as any of DNN1 162(1), DNN2 162(2), and or DNN3 162(3), which can be identified for one or more protocol data unit (PDU) sessions to be established via mobile core network 130 for a WWAN/5G/nG user equipment (UE), such as a WWAN device 104 as shown in FIG. 1.

The WWAN device 104, as shown in FIG. 1, can have a cellular subscription/subscription data/information stored via mobile core network 130. Each of DNN1 162(1), DNN2 162(2), and DNN3 162(3) may be associated with a given domain. For example, DNN1 162(1) may be associated with a domain 'abc.com', DNN2 162(2) may be associated with a domain 'mno.com', and DNN3 162(3) may be associated with a domain 'xyz.com'.

Venue 102 may include a number of physical tenant locations or spaces (e.g., businesses, stores, offices, floors, etc.) that can be utilized by each of a number of tenants, such as a location/space of a first tenant, shown in FIG. 1 as a Tenant1 110(1), and a location/space for a second tenant, shown in FIG. 1 as a Tenant2 110(2), in which each respective tenant, Tenant1 110(1) and Tenant2 110(2) may operate a respective wireless local area network (WLAN) to provide wireless connectivity for wireless devices that may be present at each tenant location/space. Venue 102 may further include a 3GPP 5G/nG/cellular/WWAN CPE/gateway/device, shown in FIG. 1 as WWAN device 104.

In various embodiments, the WWAN device 104 may include any combination of hardware, software, logic, and/or the like to facilitate wired connectivity (e.g., via wired wide area network (WAN) ports/hardware/software/logic) with WLAN equipment operated by one or more tenants of venue 102, such as Tenant1 110(1) and Tenant2 110(2), and may also facilitate wireless (e.g., Radio Frequency (RF)) 5G/nG/cellular connectivity with WWAN 120/radio node 122.

For example, Tenant1 110(1) may operate a WLAN access point (AP) 112(1) that provides a WLAN coverage area for a WLAN 113(1) (e.g., represented via the dashed-line ellipse, which may be representative of any Wi-Fi®/Institute of Electrical and Electronics Engineers (IEEE) 802.11 (any variant(s) thereof) WLAN) that may serve any number of wireless devices at the location/space of Tenant1 110(1), such as a wireless device 114(1). In another example, Tenant2 110(2) may operate a WLAN access point (AP) 112(2) that provides a WLAN coverage area for a WLAN 113(2) (e.g., represented via the dashed-line ellipse, which may be representative of any Wi-Fi®/IEEE 802.11 WLAN) that may serve any number of wireless devices at the location/space of Tenant2 110(2), such as a wireless device 114(2).

As shown in FIG. 1, WLAN AP 112(1) operated by Tenant1 110(1) interfaces with WWAN device 104 via a wired connection 108(1), which may be an Ethernet-based wired connection in at least one embodiment. Further, WLAN AP 112(2) operated by Tenant2 110(2) interfaces with WWAN device 104 via a wired connection 108(2), which may also be an Ethernet-base wire connection in at least one embodiment. It is to be understood that any number of networking devices (e.g., routers, switches, etc.) may be present in system 100 to facilitate wired connectivity between WWAN device 104 and each of WLAN AP 112(1) and WLAN AP 112(2), such that each WLAN AP may not be directly interconnected with the WWAN device 104. Further, although not shown in FIG. 1, in some embodiments, one or more of WLAN AP 112(1) and/or WLAN AP 112(2) may be operated in conjunction with one or more wireless LAN controllers (WLCs) operated by each tenant and/or an operator operating network(s) for venue 102. Further, it is to be understood that that each of Tenant1 110(1) and Tenant2 110(2) may operate multiple WLAN APs for their respective locations/spaces.

Regarding mobile core network 130, mobile core network 130 may include any number of physical network functions (PNFs) and/or virtualized network functions (VNFs), such as a user plane function (UPF) 132(1) provided via a network slice 134(1) and a number of control plane (CP) functions 140, such as an Access and Mobility Management Function (AMF) 142, a Session Management Function (SMF) 144, a Policy Control Function (PCF) 146, a Unified Data Management (UDM) entity, shown in FIG. 1 as UDM 148, an Authentication, Authorization, and Accounting (AAA) server or service, shown in FIG. 1 as AAA 150, and an Application Function (AF) 152. In some embodiments, CP functions may include an authorization/authentication portal function, referred to herein as 'auth' portal 154. In some instances, auth portal 154 may be provided via data networks 160. In some embodiments, UDM 148 can interface with and/or be implemented in combination with a Unified Data Repository (UDR) (not shown in FIG. 1).

In some embodiments, one or more network slices may be provided via mobile core network 130, such as network slice 134(1) associated with DNN1 162(1), a network slice 134(2) associated with a DNN2 162(2), and a network slice 134(3) associated with a DNN3 162(3). In some instances, a network slice can be associated with multiple DNNs. A network slice is a logical end-to-end network, often instantiated via a combination of slice resources, such as VNFs, in which the network slice can be dynamically created (instantiated) and may include any combination of 3GPP mobile core network functions/functionality (e.g., any combination of user plane and/or control plane functions). Thus, a network slice can generally refer to a group or set of slice resources that are configured and instantiated in order to facilitate mobile network services. Various example network slice types can include, but not be limited to, a cellular vehicle to everything (V2X) network slice type that can provide cellular V2X services, a massive IoT (mIoT) network slice type that can provide IoT related services, an Ultra-Reliable Low-Latency Communication (URLLC) network slice type that can provide URLLC services, an enhanced Mobile Broadband (eMBB) network slice type that can provide mobile broadband services, a massive Machine-Type Communication (mMTC) network slice type that can provide MTC services, a High Performance Machine-Type Communication (HMTC) network slice type that can provide HMTC services, etc. Other slice types can be configured/instantiated by a mobile network operator that may or may not conform to standards-based network slice types. In accordance with 3GPP standards, a network slice may be identified via a Single Network Slice Selection Assistance Information (S-NSSAI) identifier; however, for various examples/operations discussed for embodiments herein, network slices may be identified using numerical labels, for ease of illustration/discussion only.

Generally, for mobile core network 130, the CP functions 140 may interface with each other via a service-based interface (SBI) or any other appropriate interface. Further, SMF 144 may interface with UPF 132(1) (e.g., via a 3GPP N4 interface), in which UPF 132(1) which may also interface with radio node 122 of WWAN 120 (e.g., via a 3GPP N3 interface), with data networks 160 (e.g., via 3GPP N6 interface(s)), as well as AAA 150. AMF 142 may also interface with radio node 122 of WWAN (e.g., via a 3GPP N2 interface). Any of CP functions 140 may also interface with any VNFs of network slices 134(2) and/or 134(3) in accordance with any 3GPP standards, such as 3GPP Technical Specification (TS) 23.501, 23.502, etc.

In accordance with embodiments herein, WWAN device 104, in addition to wired connections 108(1) and 108(2) with each WLAN AP 112(1) and WLAN AP 112(2), can also facilitate one or more WWAN wireless connections with radio node 122 of WWAN 120, such as a WWAN wireless connection 124, as shown in FIG. 1.

Thus, for WWAN wireless/cellular connections facilitated by a WWAN gateway/router/device, such as WWAN device 104, in accordance with embodiments herein, the WWAN device 104 may be characterized as a WWAN/5G/nG UE such that the WWAN device 104 can be configured with WWAN/5G/nG wireless hardware, software, logic, etc. (e.g., baseband processor(s), modem(s), RF transceiver(s), antenna(s), etc.) and at least one WWAN/5G/nG subscription profile that may be configured/provided for an SIM or electronic or embedded (eSIM) profile 105 provisioned for the WWAN device 104; for example, for an embedded Universal Integrated Circuit Card (cUICC) and/or the like provided for the WWAN device 104 (not shown).

In various embodiments, a cellular subscription profile provisioned for WWAN device 104, such as for eSIM profile 105, can include a subscription/device identifier for the gateway/UE/device, such as an International Mobile Subscriber Identity (IMSI), Subscription Permanent Identifier (SUPI), Permanent Equipment Identifier (PEI), International Mobile station Equipment Identity (IMIE), and/or the like, along with any other appropriate subscription information/data (e.g., Integrated Circuit Card Identifier (ICCID), security algorithms, authentication/security key(s), etc. along with network identifier metadata that may include a Public Land Mobile Network (PLMN) Identifier(s) PLMN ID(s), Network Identifier (NID), Access Point Name (APN) and/or DNN information, operating frequencies, etc., in accordance with 3GPP standards). For various example operations discussed herein with reference to system 100, consider that WWAN device 104 is provisioned with a SUPI corresponding to 'SUPI:104'.

In some embodiments, a WWAN device, such as WWAN device 104, can potentially support multi-operator connectivity (e.g., to facilitate connections with different 5G/nG operators) via multiple WWAN/5G/nG modems and subscription profiles (e.g., multiple eSIM profiles) that can be utilized to facilitate connections with different 5G/nG accesses provided by different 5G/nG MNOs/SPs (e.g., Operator 1, Operator 2, etc.).

Further in accordance with embodiments herein, WWAN device 104 may store, via URSP storage 106, a URSP policy envelope that may include a URSP rule for a default PDU session to be established by WWAN device 104 with mobile core network 130 in which the URSP policy envelope for the WWAN device 104 can be obtained by the WWAN device 104 through registration with the mobile core network 130.

Further, the URSP storage 106 may be utilized by the WWAN device 104 to store a corresponding URSP envelope for each of Tenant1 110(1) and Tenant2 110(2) in which each corresponding URSP envelope can be obtained for each of Tenant1 110(1) and Tenant2 110(2) through a secondary authentication process (involving AAA 150) triggered for each tenant or, more specifically, for each of WLAN AP 112(1) for Tenant1 110(1) and for WLAN AP 112(2) for Tenant2 110(2). Through each secondary authentication process performed for each of Tenant 1 110(1) and Tenant2 110(2), the WWAN device 104 can obtain a corresponding URSP envelope for each tenant from the AAA 150 in which the URSP envelop obtained for each tenant can include one or more URSP rules that are to be utilized by the WWAN device 104 to establish one or more PDU sessions for each tenant in accordance with the URSP rules of each URSP envelope.

Generally, a URSP rule can include (e.g., as prescribed at least by 3GPP TS 24.526, 23.503, etc.) a traffic descriptor portion and a route descriptor portion. A precedence value can also be configured for a URSP rule. Generally, the traffic descriptor portion of a URSP rule can include information that can be used (e.g., by a UE/WWAN device 104), to identify traffic for which a given URSP rule applies, such as application descriptors (e.g., an application identifier (ID) (associated with certain traffic)), IP descriptors (e.g., destination IP address, port, and/or protocol), domain descriptors (e.g., 'example.com', a Fully Qualified Domain Name (FQDN), etc.), DNN, non-IP descriptors, connection capabilities, and/or the like. Generally, a device can identify traffic to which a given URSP rule applies/is to be applied by matching parameters/elements of packet(s) of the traffic to the various traffic descriptors configured for the given URSP rule).

The route descriptor portion of a URSP rule can included one or more route descriptor(s) that WWAN device 104 can utilize for establishing a PDU session for traffic associated with the URSP rule, such as network slice information (e.g., S-NSSAI), Session and Service Continuity (SSC) mode, DNN selection, etc.

Through embodiments of system 100, new service definitions can be enabled that facilitate providing communication/data services to wired tenants over a shared 5G/nG on-premise device, such as shared WWAN device 104, that may facilitate both wired network connectivity to tenant locations/WLAN equipment and WWAN connectivity to one or more mobile core networks, such as mobile core network 130. In at least one embodiment, the shared WWAN device 104 can be centrally located and can serve multiple tenants for an environment, such as Tenant1 110(1) and Tenant2 110(2) for venue 102.

Broadly, during operation of system 100 in accordance with embodiments herein, a corresponding wireline tunnel, such as an Ethernet over General Routing Encapsulation (EoGRE) tunnel and/or the like, can be established between each of a corresponding WLAN termination device of each of Tenant1 110(1) and Tenant2 110(2) and the WWAN device 104. For example, during operation of system 100, a tunnel 109(1) can be established, via wired connection 108(1), between Tenant1's WLAN AP 114(1) and WWAN device 104 and a tunnel 109(2) can be established, via wired connection 108(2), between Tenant2's WLAN AP 114(2) and WWAN device 104. In some embodiments, tunnels 109(1) and 109(2) can be corresponding EoGRE tunnels established for each tenant/WLAN AP.

In accordance with embodiments herein, Tenant1 110(1) and WLAN AP 114(1) can be configured with a Network Access Identifier (NAI) for Tenant1, such as 'Tenant1@abc.com', which can be used for various operations as discussed for embodiments herein. Further, Tenant2 110(2) and WLAN AP 114(2) can be configured with an NAI for Tenant2, such as 'Tenant2@abc.com', which can be used for various operations as discussed for embodiments herein.

During operation of system 100, embodiments herein may facilitate authentication tenant wired/wireline connectivity with the WWAN device 104, via corresponding tunnels 109(1) and 109(2), which may be, for example, EoGRE tunnels, without involving any identity for 5G/nG services (e.g., such as a SIM/eSIM profile or 5G/nG wireless modem identity) to authenticate such wired connectivity between each of WLAN AP 112(1) and WLAN AP 112(2) and the WWAN device 104.

Various techniques may be utilized for tunnel establishment in accordance with embodiments herein. For example, in some instances, a static configuration can be provided for each WLAN AP 112(1) and WLAN AP 112(2) including endpoint information for the WWAN device 104 (e.g., IP address, etc.) that can be utilized to initiate an exchange with the WWAN device 104 regarding tunnel establishment using techniques as would be understood by a person of ordinary skill in the art. In another example, in some instances, each WLAN AP 112(1) and WLAN AP 112(2), upon bootup, can perform a Domain Name System (DNS) lookup on a standard Fully Qualified Domain Name (FQDN). For example, each WLAN AP 112(1) and WLAN AP 112(2), after bootup, can obtain an IP address through a Dynamic Host Configuration Protocol (DHCP) process along realm information (e.g., venue 102real m.com) from which each WLAN AP can formulate a DNS query (e.g., wwangateway103.venue102realm.com) and perform a DNS lookup in order to determine the IP address, etc. for the WWAN device 104 (the DNS can be configured with the FQDN so that the WLAN APs can formulate the query). Thereafter, the respective tunnels for each WLAN AP 112(1) and WLAN AP 112(2) can be established using techniques as would be understood by a person of ordinary skill in the art.

The WWAN device 104 can store a unique identifier for tenant for each tenant with which a wireline tunnel is established in a mapping or other correlation table/database/data structure that identifies each corresponding tunnel in association with each tenant For example, in some embodiments, a tenant identifier (T-ID) for Tenant1 110(1) can be set as 'T-ID=1101' and a T-ID for Tenant2 110(2) can be set as 'T-ID=1102' and WWAN device 104 can store in a table/database/data structure, a tenant mapping that identifies each corresponding tunnel in association with each tenant, such as: tunnel 109(1)=T-ID(1101) and tunnel 109 (2)=T-ID(1102). In some embodiments, the WWAN device 104 can store in a table/database/data structure, a tenant mapping that identifies each corresponding tunnel in association with each tenant NAI, such as tunnel 109(1) =Tenant1@abc.com and tunnel 109(2)=Tenant2@abc.com. Other tenant-to-tunnel mappings can be envisioned, potentially including combinations of T-ID+NAI and/or any other mappings (e.g., tenant certificate identifier, or the like that may be associated with a tenant subscription).

In some embodiments, the tenant ID for each tenant for each respective EoGRE tunnel 109(1) and 109(2) can be sent to each respective WLAN AP 112(1) and 112(2), such that each respective WLAN AP 112(1) and 112(2) can include its respective tenant ID in communications sent to WWAN device 104.

During operation in accordance with embodiments herein system 100 may facilitate establishment of one or more WWAN/5G/nG PDU session(s) for each tenant of the multiple tenants, such as Tenant1 110(1) and Tenant2 110(2), that may be sharing the WWAN device 104 in which each PDU session can be established for each of a given tenant in accordance a corresponding URSP rule identified by the WWAN device 104 for a URSP policy envelope obtained by the WWAN device 104 for each given tenant.

For example, in at least one embodiment, one or more WWAN PDU session(s) 126(1) can be established by WWAN device 104 with mobile core network 130 (via UPF 132(1)/network slice 134(1), for example) for use by Tenant1 110(1) or, more specially, for any number of wireless devices connected to WLAN AP 112(1) for which data plane communications can be provided via WWAN PDU session(s) 126(1) for each of one or more DNN(s)/network slice(s) via mobile core network 130. Each of the WWAN PDU session(s) 126(1) can be established in accordance with a URSP rule contained within a URSP envelope for Tenant 1 110(1) that is obtained by the WWAN device through a secondary authentication process triggered for the Tenant1 110(1)/WLAN AP 112(1) in accordance with embodiments herein.

Although only one wireless device 114(1) is shown in system 100 for Tenant1, it is to be understood that multiple wireless devices connected to WLAN AP 112(1) can be served via corresponding PDU session(s) 126(1) established for Tenant1. For example, a PDU session established for a given DNN/network slice (e.g., DNN1 162(1)/network slice 134(1)) can be utilized to carry traffic for multiple wireless devices having communications associated with the given DNN/network slice. Another PDU session can be established for another DNN/network slice (in accordance with the URSP rules of the URSP envelope of Tenant1, such as a PDU session for DNN2 162(2)/network slice 134(2)) that can carry traffic for other multiple wireless devices having communications associated with the different DNN/network slice.

Further, one or more WWAN PDU session(s) 126(2) can be established by WWAN device 104 with mobile core network 130 (via UPF 132(1)/network slice 134(1), for example) for usc by Tenant2 110(2) or, more specially, for any number of wireless devices connected to WLAN AP 112(2) for which data plane communications can be provided via WWAN PDU session(s) 126(2).) for each of one or more DNN(s)/network slice(s) via mobile core network 130. Each of the WWAN PDU session(s) 126(2) can be established in accordance with a URSP rule contained within a URSP envelope for Tenant2 110(2) that is obtained by the WWAN device through a secondary authentication process triggered for the Tenant2 110(2)/WLAN AP 112(2) in accordance with embodiments herein. Similar to Tenant1, although only one wireless device 114(2) is shown in system 100 for Tenant2, it is to be understood that multiple wireless devices connected to WLAN AP 112(2) can be served via corresponding PDU session(s) 126(2) established for Tenant2.

Per-tenant URSP envelopes for each of Tenant1 110(1) and Tenant2 110(2) are discussed in further detail below with reference to FIGS. 2A, 2B, 2C, 2D, and 2E.

In some embodiments, a tenant mapping stored by WWAN device 104 can utilize an IP version 6 (IPv6) prefix allocated to a given tenant (e.g., by the mobile core network, such as by SMF 144, and/or by WWAN device 104) for a PDU session involving the given tenant such that the tenant mapping can identify a given wireline tunnel (e.g., EoGRE tunnel) for the given tenant based on the IPv6 prefix in addition to and/or in lieu of the tenant identifier/NAI for the given tenant. By way of example only, an IPv6 prefix (network address and subnet) of '2001:00BC:AB00:1101::0/64' (or any appropriate subnetwork range) can be allocated to Tenant1 110(1) for use with one or more PDU session(s) 126(1) that may be established for Tenant1 110(1) in which wireless devices, such as wireless device 114(1) can be allocated an IP address from the IPv6 prefix range or block for use of a corresponding PDU session established for Tenant1 110(1). In another example, an IPv6 prefix of '2001:00BC:AB00:1102::0/64' can be allocated to Tenant2 110(2) for use with one or more PDU session(s) 126(2) that may be established for Tenant2 110(2) in which wireless devices, such as wireless device 114(2) can be allocated an IP address from the IPv6 prefix range or block for use of the PDU session.

In some embodiments, different subnetwork ranges or subsets/pools of IP addresses for a given IPv6 prefix can be allocated to different tenants; for example, for different PDU sessions that may be established for different tenants (e.g., an address range of 10.10.1.0 to 10.10.1.50, or prefix 10.10.1.0/24, or in IPv6 CAFE::/64 or BABA::/48, and/or any variations thereof).

Embodiments herein can enable tenants with the ability to choose a specific subscription package, services, and be responsible for the service charges for wireless devices that utilize 5G/nG connectivity via each corresponding tenant.

Further, embodiments of system 100 may enable differentiated service levels (e.g., network slice differentiation, Quality of Service (QOS) differentiation, Service-Level Agreement (SLA) differentiation, etc.) based on the subscription levels that may be utilized by each of multiple tenants that may utilize the WWAN device 104 for WWAN/3GPP/5G/nG/cellular wireless network connectivity.

As one billing record generated only on the basis of the WWAN device 104 itself for WWAN PDU session(s) triggered by WWAN device 104 for establishment with mobile core network 130 not be sufficient to appropriately determine the charging incurred by each tenant's use of the WWAN device 104, system 100 may provide for the ability to generate per-tenant charging records for each tenant that may utilize the WWAN device 104 for WWAN/5G/nG wireless network connectivity.

For example, during operation of system 100, WWAN device 104 can utilize the tenant mapping information (e.g., T-ID, IPv6 prefix, NAI, tenant certificate, etc.) in order to identify data packet(s) sent to mobile core network 130 for a given WWAN PDU session such that the tenant mapping information can be used to identify data packets for data plane communication that are to be charged to/billed to a particular tenant.

In at least one embodiment, for data plane communications involving a given wireless device connected to a particular WLAN AP for a particular tenant (for which a WWAN PDU session is provided with a mobile core network by the WWAN gateway), a T-ID (or other identifier) for the particular tenant can be included by the WWAN device 104 in a General Packet Radio Service (GPRS) Tunneling Protocol (GTP) user-plane (GTP-U) header for GTP-U packets sent to the mobile core network; for example, to UPF 132(1). Using the T-ID included in the GTP-U header(s) of such packets, the UPF 132(1) can generate Usage Report Record(s) URR(s) including charging information for the particular tenant that can be sent to the SMF 144 that can generate charging data records (CDR(s)) including the T-ID that can be sent to a charging system/function (not shown) that can generate billing/invoices for the particular tenant.

In some embodiments, IPv6 prefix information and/or subnet information of an IPv6 prefix associated with a particular tenant can be used by the UPF 132(1) to generate URR(s) in addition to and/or in lieu of using T-ID/NAI information.

Accordingly, embodiments herein may provide for the ability for a network, such as mobile core network 130, to deliver tenant specific URSP rules to a 5G/nG CPE, such as WWAN device 104. The URSP rules can be delivered/provided to the WWAN device using separate URSP envelopes. In at least one embodiment, each per-tenant URSP envelope can be associated with a WWAN/5G/nG subscription identity of the WWAN device 104, such as the SUPI of the WWAN device (e.g., SUPI:104) and a given tenant identifier, which may be include any combination of a tenant identity (e.g., T-ID), tenant NAI, or other identity for a given tenant.

Through operation of system 100, WWAN device 104 can register with the mobile core network 130, obtain its own URSP envelope (e.g., associated with the SUPI of WWAN device 104) through registration with the mobile core network registration and establish a default PDU session with the mobile core network. Thereafter, per-tenant PDU activation (session establishment) can be performed in a tenant-specific manner based on First-Sign-of-Life (FSOL) on ingress links/ports of the WWAN device 104, for example, upon receiving a data packet from a given tenant WLAN AP that matches a URSP rule for a URSP envelope for the given tenant, as discussed in further detail herein.

Thus, embodiments herein may be utilized to extend the 3GPP semantics of delivering a singular URSP to a registered device, with the multiplicity of delivering URSP policy envelopes, each unique to a given tenant. As noted above, each per-Tenant URSP envelope can be associated with both the CPE/WWAN device 104 identity (e.g., SUPI) and a tenant specific identity (e.g., NAI or the like) that may enable a given tenant specific URSP envelope (containing one or more tenant specific URSP rules) to be delivered to the WWAN device 104 through a secondary authentication process for the given tenant (WLAN AP for the tenant) for tenant identity establishment in which the tenant specific URSP envelope can be delivered to the WWAN device using a 3GPP UE configuration update procedure as would be understood by persons having ordinary skill in the art.

Accordingly, embodiments herein may provide for bringing tenant specific policies and giving a multi-user/tenant color to a single SIM device, such as WWAN device 104, which may allow mobile network operators to explore new business models.

Accordingly, embodiments herein may provide for bringing tenant specific policies and giving a multi-user/tenant color to a single SIM device, such as WWAN device 104, which may allow mobile network operators to explore new business models. In particular, embodiments herein may provide for using a single CPE box with a single SIM, such as WWAN device 104, through which multiple mobile network subscriptions can be sold to each of multiple (wired) tenants that can share the WWAN device 104 for wireless connectivity with a 5G/nG/cellular mobile network.

By bringing tenant identification and authentication, such PDU coloring semantics may provide a starting point for enabling multi-tenancy using such a shared 5G/nG/cellular WWAN device, such as WWAN device 104. By providing for the ability to use multiple URSP policies/envelopes (per-tenant, containing multiple URSP rules) for a single SIM, providing logic to facilitate delivery of the URSP policies to a shared 5G/nG/cellular UE/CPE/WWAN device, providing logic for binding a URSP envelope/rules to a tenant ID, providing logic for linking URSP policies/rules to per-tenant authentication, and enforcing the URSP policies on the same 5G/nG/cellular UE/CPE/WWAN device, embodiments herein facilitate providing multi-tenant policy support for an environment in which multiple tenants may utilize a shared 5G/nG/cellular UE/CPE/WWAN device to connect with and communicate traffic via a 5G/nG/cellular mobile network.

Consider various example operations that can be performed via system 100 as shown via FIGS. 2A, 2B, 2C, 2D, and 2E, which are a message sequence diagram 200 illustrating various example operations that may be performed to facilitate providing per-tenant URSPs in a multi-tenant environment involving shared WWA access network equipment, such as WWAN device 104, according to an example embodiment. FIGS. 2A-2E illustrate example operations in which one or more WWAN/5G/nG PDU session(s) can be provided for each of Tenant1 110(1) and Tenant2 110(2) that are sharing the WWAN device 104 that provides WWAN connectivity with mobile core network 130.

FIGS. 2A-2E include wireless device 114(1) and WLAN AP 112(1) associated with Tenant1 110(1) location, wireless device 114(2) and WLAN AP 112(2) associated with Tenant2 110(2) location, WWAN device 104 (including eSIM profile 105). Also shown in FIGS. 2A-2E are AMF 142, SMF 144, UPF 132(1), PCF 146, UDM 148, and AAA 150 of mobile core network 130. WWAN 120 including radio node 122 is not shown in FIGS. 2A-2E for purposes of brevity only; however, it is to be understood that WWAN device 104 can connect to/interface with any elements/functions of mobile core network 130 via a corresponding wireless connection with the WWAN 120/radio node 122 in order to facilitate various operations discussed herein.

As shown at 202, consider that AF 152 maintains a configuration of known tenants of system 100 (Tenant1 110(1) and Tenant2 110(2)) independent of the shared WWAN device 104, and, in at least one embodiment, can be used to configure AAA 150 with per-tenant QoS policies and URSP envelopes.

In at least one embodiment, as shown at 204 consider that AAA 150 is provisioned/configured with per-tenant QoS policies and URSP envelopes. For example, a QoS policy 206(1), including one or more QoS parameters, can be configured/provisioned for Tenant1 110(1) that identifies the NAI of Tenant1 (Tenant1@abc.com), along with various QoS parameters for the policy, such as slice information, DNN information, Maximum Bit Rate (MBR) information, Guaranteed Bit Rate (GBR) information, QoS Class Identifier (QCI) information, Allocation and Retention Priority (ARP) information and/or any other QoS related information that may facilitate traffic handling for one or more PDU sessions that may be provided for Tenant 1 110(1). Similarly, a QoS policy 206(2) can be configured/provisioned for Tenant2 110(2) that identifies the corresponding NAI and various QoS information for Tenant2 110(2). In a conventional environment, QoS policies are typically driven by the PCF, however, embodiments herein facilitate driving such policies through the AAA 150.

Further as shown at 204, a URSP envelope 208(1) can be configured/provisioned for Tenant1 110(1) that identifies the NAI for Tenant1 (Tenant1@abc.com) and two URSP rules (in this example, not meant to limit embodiments herein) in which a first URSP rule for the URSP envelope 208(1) includes a traffic descriptor identifying a destination IP address of '1.1.1.1' and a route descriptor identifying that a PDU session for traffic matching the traffic descriptor is to be established for DNN1 162(1) (abc.com) via network slice 134(1). In accordance with embodiments herein, the (first) URSP rule for the URSP envelope 208(1) can be enhanced to include identifying information for the WWAN device 104, such as the SUPI:104 for WWAN device 104. In at least one embodiment, the identifying information for the WWAN device 104 can be used to identify the device to which to send the URSP envelope 208(1)/URSP rule(s) for Tenant1 110(1). Also shown for URSP envelope 208(1) is a second URSP rule that includes a traffic descriptor identifying a destination IP address of '2.2.2.2' and a route descriptor identifying that a PDU session for traffic matching the traffic descriptor is to be established for DNN2 162(2) (mno.com) via network slice 134(2). The (second) URSP rule for the URSP envelope 208(1) can also be enhanced to include identifying information for the WWAN device 104, such as the SUPI:104 for WWAN device 104.

Further as shown at 204, a URSP envelope 208(2) can be configured/provisioned for Tenant2 110(1) that identifies the NAI for Tenant2 (Tenant2@abc.com) and two URSP rules (in this example, not meant to limit embodiments herein) in which a first URSP rule for the URSP envelope 208(2) includes a traffic descriptor identifying a destination IP address of '1.1.1.1' and a route descriptor identifying that a PDU session for traffic matching the traffic descriptor is to be established for DNN1 162(1) (abc.com) via network slice 134(1). In accordance with embodiments herein, the (first) URSP rule for the URSP envelope 208(2) can be enhanced to include identifying information for the WWAN device 104, such as the SUPI:104 for WWAN device 104. Also shown for URSP envelope 208(2) is a second URSP rule that includes a traffic descriptor identifying a destination IP address of '2.2.2.2' and a route descriptor identifying that a PDU session for traffic matching the traffic descriptor is to be established for DNN2 162(2) (mno.com) via network slice 134(2). The, (second) URSP rule for the URSP envelope 208(2) can also be enhanced to include identifying information for the WWAN device 104, such as the SUPI: 104 for WWAN device 104.

The example URSP rules illustrated for URSP envelopes, URSP envelope 208(1) for Tenant1 110(1) and URSP envelope 208(2) for Tenant2 110(2), are provided for illustrative purposes only and are not meant to limit the broad scope of embodiments herein. It is to be understood that any combination of URSP rules can be configured for different tenant URSP envelopes in accordance with embodiments herein.

As shown at 210, consider that various subscription information for one or more UE of system 100, such as for WWAN device 104, can be configured for UDM 148. In at least one embodiment, the subscription information configured at 210 for WWAN device 104 can include a subscription identifier for WWAN device 104, such as the SUPI provided for the WWAN device 104 (e.g., SUPI:104).

Other subscription information may be configured for the WWAN device 104 via UDM 148 in accordance with embodiments herein. For example, in some embodiments, subscription information configured for WWAN device 104 can include an indication of a maximum number of PDU sessions per tenant that can be established via the WWAN/mobile core network.

In some embodiments, the subscription information configured for WWAN device 104 can include an indication, flag, or other identifier that indicates that per-tenant-secondary authentication is enabled for the WWAN device 104 (e.g., 'Per-Tenant-Secondary-Auth: True') such that, for each tenant for which data plane communications/PDU session establishment is triggered, a secondary authentication process is to be utilized via AAA 150 in order to authenticate/authorize IP data plane communications for the particular tenant. In some embodiments, the WWAN device 104 can be configured (e.g., manually, by an administrator, etc.) to trigger secondary authentication operations for each of multiple tenants sharing the WWAN device 104.

In still some embodiments, the subscription information configured for WWAN device 104 can include an indication, flag, or other identifier that indicates that per-tenant charging is enabled for the WWAN device 104 (e.g., 'Per-Tenant-Charging: True') such that, for each tenant for which data plane communications/PDU session establishment is triggered (and successfully authenticated/authorized), per-tenant charging information is to be generated for data plane communications involving each tenant. Specifically, such charging subscription information can be used to initiate/trigger per-tenant charging information to be generated for each particular tenant for each of multiple potential wireless devices for which data plane communications can be handled for each particular tenant (for each of multiple PDU sessions) for mobile core network 130.

Per-tenant charging information that can be generated by a UPF, such as UPF 132(1), can include per-tenant URRs in which each URR generated for a particular tenant can include the particular tenant ID (T-ID) or other tenant identifier for the particular tenant. Further, per-tenant charging information that can be generated by an SMF, such a SMF 144, can include per-tenant CDRs based on per-tenant URRs received from a UPF, in which each CDR generated for a particular tenant can include the particular tenant ID (T-ID) for the particular tenant, which can further be sent to a charging system for billing the particular tenant appropriately.

In still some embodiments, the subscription information configured for WWAN device 104 can include an indication, flag, or other identifier that indicates that per-tenant QoS differentiation is to be provided for data plane communications/PDU sessions involving each tenant (e.g., 'Per-Tenant-QoSPolicy: True' or the like) based on a corresponding QoS policy for each tenant (e.g., as may be provided by AAA 150 to WWAN device through secondary authentication for a given tenant). Such QoS differentiation, as provided for a particular QoS policy for a particular tenant, can be provided for data plane communications that can be handled for each particular tenant (via separate PDU sessions or via a shared PDU session) for mobile core network 130.

Figure 2A:
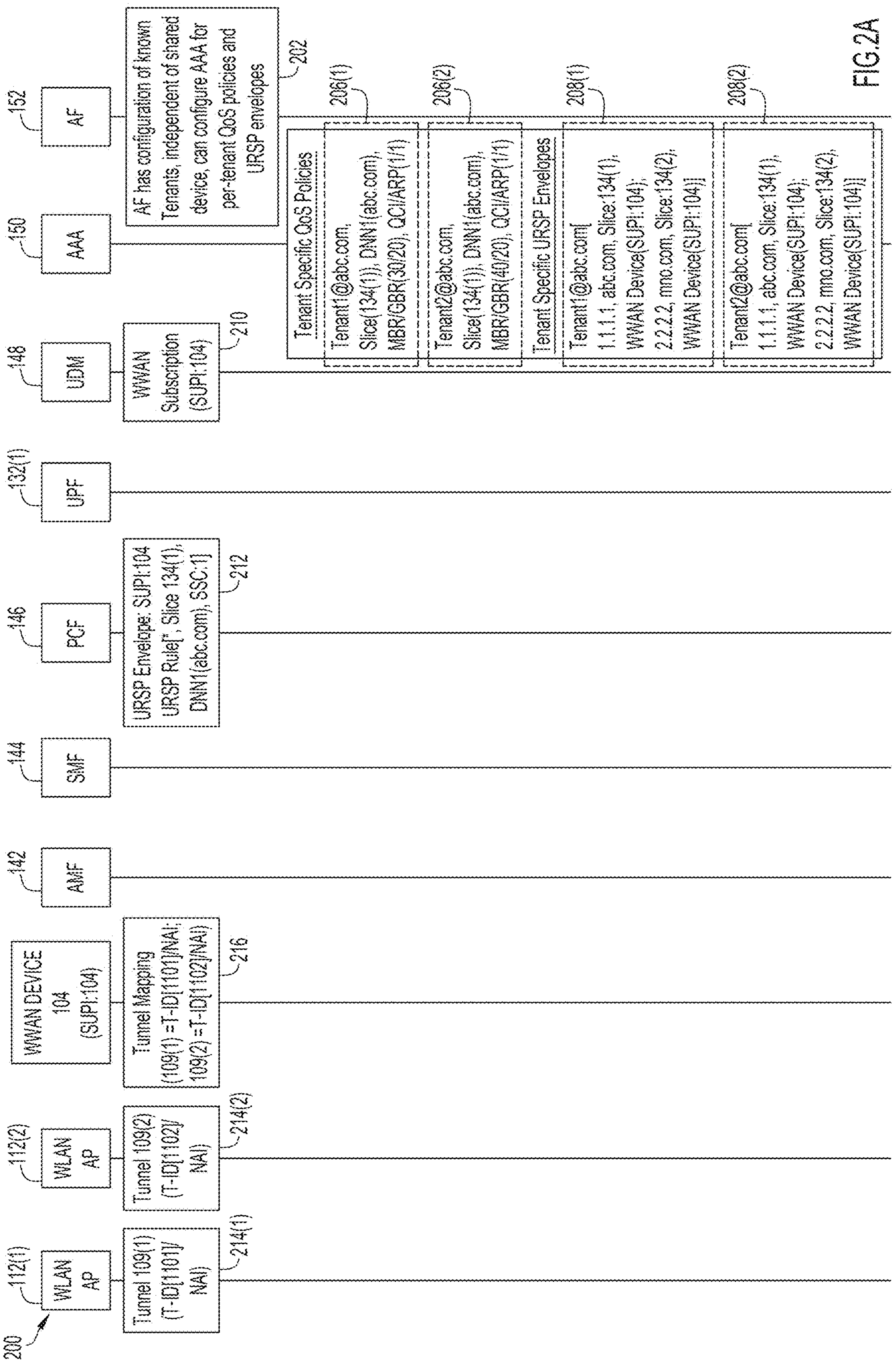
FIGS. 2A, 2B, 2C, 2D, and 2E are a message sequence diagram illustrating various example operations that may be performed to facilitate providing per-tenant URSPs in a multi-tenant environment involving shared wireless wide area access network equipment, according to an example embodiment.

As shown at 212, subscription policy information for the WWAN device 104 can be configured/provisioned at PCF 146 in which the subscription policy information for the WWAN device 104 can include a URSP envelope for WWAN device 104 that includes a URSP rule having a traffic descriptor portion that includes a "match all" indicator, shown in FIG. 2A as '*', which indicates that the URSP rule represent a default URSP rule for a default PDU session to be established by the WWAN device 104 via mobile core network. The URSP rule for the WWAN device 104 may further include a route descriptor identifying that a (default) PDU session for the WWAN device 104 is to be established for DNN1 162(1) (abc.com) via network slice 134(1).

In some embodiments, subscription policy information configured/provisioned at PCF 146 for WWAN device 104 may further include Policy and Charging Control (PCC) rules/information for WWAN device 104 and/or the venue 102 (e.g., venue provider) in which the WWAN device 104 that is to be shared by multiple tenants is implemented/provided. Such WWAN gateway/venue subscription policy information can include, but not be limited to, QoS policies contracted by the venue provider for mobile core network services, charging information to be applied to the venue provider, and/or the like.

Operations for the example embodiments of FIGS. 2A-2E can include, as generally shown at 214(1) and 214(2), each of WLAN AP 112(1) for Tenant1 110(1) location and WLAN AP 112(2) for Tenant2 110(2) location performing an auto-discovery process with the WWAN device 104 and setting up, via corresponding wired connections 108(1) and

108(2) with the WWAN device 104, a corresponding dedicated tunnel with the WWAN device 104, such as tunnel 109(1) for WLAN AP 112(1) and tunnel 109(2) for WLAN AP 112(2).

The WWAN device 104 can assign a tenant ID to each of Tenant1, such as 'T-ID=1101', and Tenant2, such as 'T-ID=1102'. Each corresponding assigned tenant ID can be provided to each corresponding WLAN AP 112(1) and WLAN AP 112(2) for use with various operations/communications involving each corresponding tunnel 109(1) and tunnel 109(2).

As shown at 216, the WWAN device 104 maintains tunnel mapping information, such a per-tenant tunnel/tenant ID mapping (e.g., tunnel 109(1)=T-ID(1101), tunnel 109(2)=T-ID(1102)). The WWAN device 104 can update the tunnel mapping information with additional per-tenant information, such as IP prefix information, PDU session identifier information, NAI for each tenant, etc. for additional operations provided by WWAN device 104 through operations discussed for embodiments herein.

In at least one embodiment, tenant IDs assigned by WWAN device 104 to tenants/tunnels for a given venue, such as venue 102, can formatted, agreed upon, or otherwise predefined/preconfigured according to subscription information, policies, etc. provided and/or exchanged between the venue provider and the MNO/SP for a given mobile core network, such as mobile core network 130, with which the venue provider/WWAN device 104 has a subscription for services so that the tenant IDs assigned by the WWAN device for corresponding tenant tunnels can also be appropriately utilized for various operations provided via the mobile core network (e.g., policy information look-up, QoS handling, charging information generation, etc.). For example, in at least one embodiment, tenants for a given venue, such as venue 102, can contract with an MNO/SP that is to provide WWAN connectivity for the venue such that tenant IDs for each tenant can effectively 'subscribe' for different levels of service (e.g., different subscription classes, such as gold, silver, bronze, etc., each with different QoS levels, etc.) that can be provided through a shared WWAN device/CPE provided for the venue. In another embodiment, tenant IDs may be preconfigured at a WWAN device and signaled to a mobile core network and the core network can ensure that the tenant IDs received from the WWAN device will be utilized/associated with any tenant specific traffic handled via the core network. In some embodiments, per-tenant NAIs can also be used in the tunnel mapping managed by WWAN device 104.

Following tunnel establishment, tenant ID assignment, and mapping operations, WWAN device 104 can perform a registration process with the mobile core network 130 in order to establish WWAN/5G/nG wireless connectivity between WWAN device 104 and mobile core network 130. For example, as shown at 220 of FIG. 2B, WWAN device 104 initiates a mobile network registration with AMF 142 (via WWAN 120/radio node 122), which triggers AMF 142 to obtain subscription information and perform an authentication process to authenticate/authorize WWAN device 104 to connect to mobile core network 130 through subscription information obtained for WWAN device 104 from UDM 148, as shown at 222. Such operations at 220 and 222 can include standards-based authentication/authorization operations performed based on the eSIM profile 105 provided for WWAN device 104 involving the SUPI for the WWAN device 104 (e.g., SUPI:104).

Upon successful authentication of the WWAN device 104, AMF 142 can obtain the URSP envelope for WWAN device 104 from PCF 146, as shown at 224_a_, and provide to the WWAN device 104, as shown at 224_b_, the URSP envelope including the URSP rule provisioned for the WWAN device 104.

The WWAN device, upon obtaining the URSP envelope/URSP rule proceed to establish a default PDU session with mobile core network 130 via network slice 134(1)/UPF 132(1), as shown at 226_a_ (e.g., PDU session request sent to AMF 142/response received from AMF 142 indicating successful session establishment), 226_b_ (e.g., session establishment procedure initiated via AMF 142 and SMF 144), 226_c_ (e.g., policy association via PCF 146), and 226_d_ (e.g., N4 session establishment between SMF 144 and UPF 132(1) for the default PDU session).

Figure 2B:
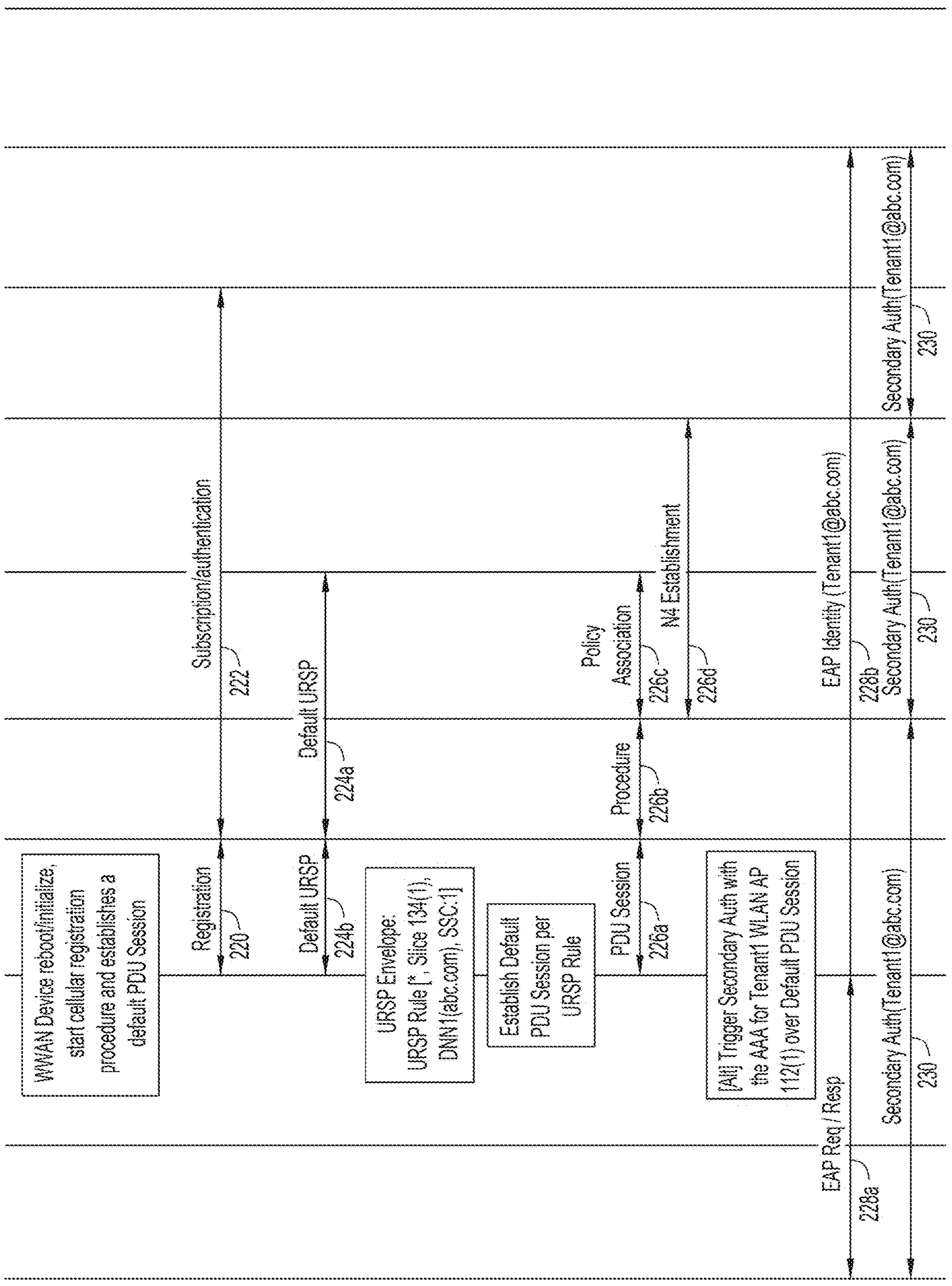

Upon establishment of the default PDU session for WWAN device 104, the WWAN device 104 can trigger a secondary authentication process for each tenant/tenant WLAN AP to perform secondary authentication with the AAA 150 over the default PDU session for WWAN device 104. The order of secondary authentication for each tenant/WLAN AP can be performed in any manner. In one example, as shown in FIG. 2B, WWAN device 104 can trigger a secondary authentication process to be performed via AAA 150 for Tenant1 WLAN AP 112(1), as shown at 228. Generally, secondary authentication of a tenant/tenant device (e.g., a WLAN AP of a tenant) can involve WWAN device 104 a challenge to the tenant device for one or more credentials, such as an Extensible Authentication Protocol (EAP) identity, to which the tenant device can respond with the requested credential(s), and the WWAN device 104 can initiate an authentication process between the tenant WLAN AP and the AAA 150 based on the credential(s) and the AAA 150 and tenant WLAN AP can exchange various messages (via the default PDU session for the WWAN device 104), such as EAP messages in accordance with 3GPP TS 33.501, in order for the tenant WLAN AP to be authenticated for establishing PDU session(s) via the mobile core network 130. The authentication is referred to as "secondary" as it is performed following a primary authentication of WWAN device 104 through the registration/authentication of the WWAN device 104 with the mobile core network 130.

Various mechanisms can be used to cause the secondary authentication process to be performed between a given WLAN AP and the AAA 150, such as the WWAN device 104 triggering the secondary authentication processes on its own or the secondary authentication process can be performed upon receiving a first data packet from a given WLAN AP (e.g., a FSOL indication) in which the secondary authentication can be triggered/performed prior to initiating a given PDU session for the tenant.

In one embodiment, WWAN device 104 can trigger the secondary authentication process for WLAN AP 112(1) by initiating a credential request/response exchange with the WLAN AP 112(1) in which the WWAN device 104 requests credentials/information from the WLAN AP 112(1), to which the WLAN AP 112(1) responds with the requested credentials/information, as generally illustrated at 228_a_. Based on the credentials/information obtained from the WLAN AP 112(1), the WWAN device 104 can send the credentials/information to the AAA 150, as generally shown at 228_b_, which triggers the AAA 150 to initiate the secondary authentication process with the WLAN AP 112(1).

In one embodiment, the credential request/response exchange between the WWAN device 104 and the WLAN AP 112(1) can involve an EAP-RequestIdentity message being sent to the WLAN AP 112(1) (via tunnel 109(1)) by the WWAN device 104 and the WLAN AP 112(1) responding with an EAP-ResponseIdentity message that includes the NAI for the WLAN AP 112(1)/Tenant1, 'Tenant1@abc.com', which the WWAN device 104 can send to the AAA 150 to cause the secondary authentication process to be performed between the AAA 150 and the WLAN AP 112(1) using the NAI, as generally shown at 230. Although EAP credentials are discussed for the present example, other credentials may be utilized, such as certificates or the like to facilitate the secondary authentication of a given tenant/WLAN AP.

In one embodiment, rather than the WWAN device 104 initiating the secondary authentication process on its own, the WWAN device 104 can cause the secondary authentication process to be performed upon receiving an FSOL data packet from the WLAN AP 112(1). For example, the credential request/response exchange to trigger the secondary authentication process can be performed upon receiving an FSOL data packet from the WLAN AP 112(1).

Figure 2C:
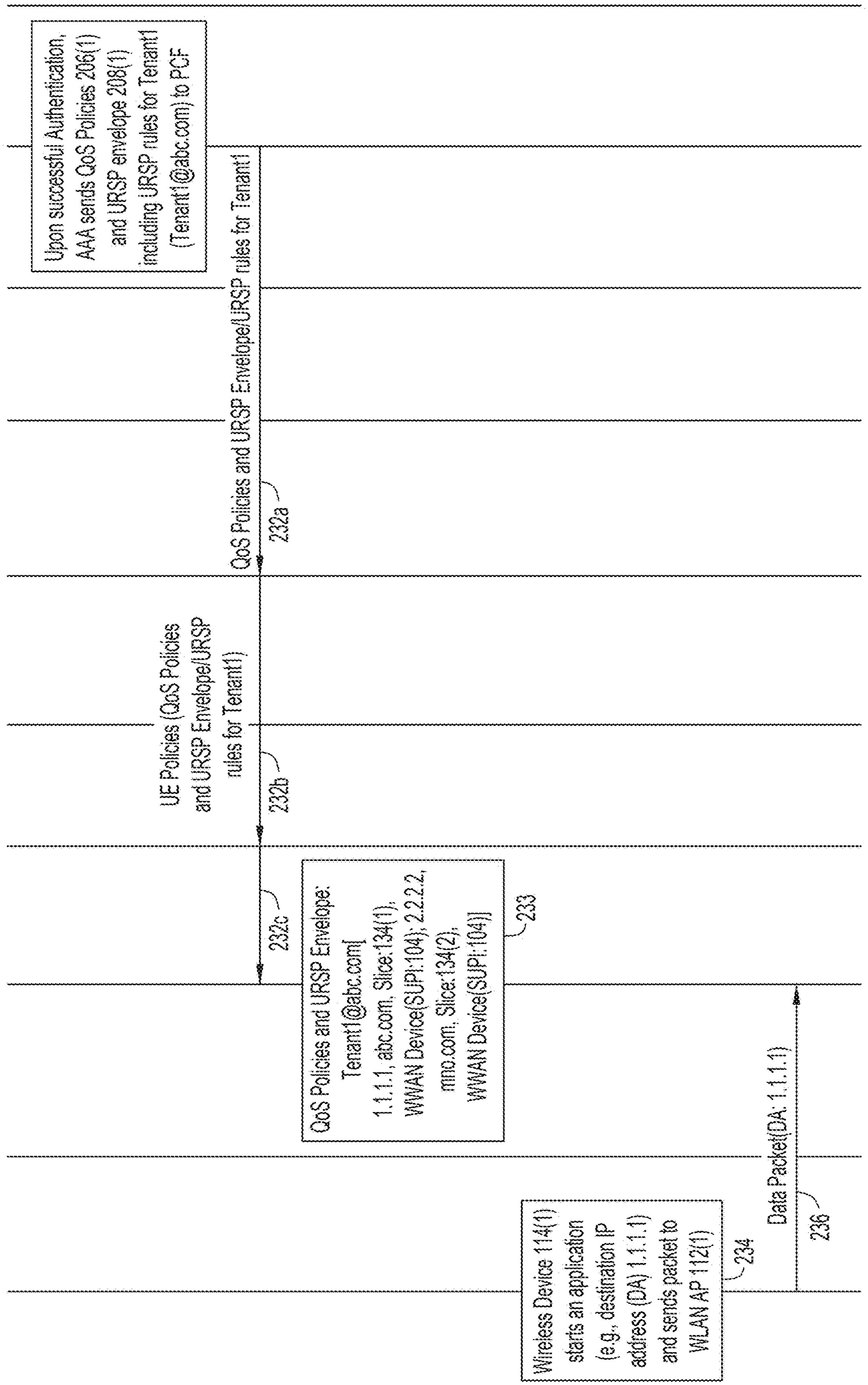

Continuing with the present flow, upon successful authentication of Tenant1/WLAN AP 112(1), as shown in FIG. 2C, the AAA 150 can send the Tenant 1 QoS policy 206(1) (including the various configured QoS parameters) and the Tenant1 URSP envelope 208(1) (including the configured URSP rules) to the PCF 146, as shown at 232*a*, and the PCF 146 can provide the Tenant1 QoS policy 206(1) and the Tenant1 URSP envelope 208(1) to the UE/WWAN device 104, as shown at 232*b* and 232*c*. The PCF 146 can identify the UE/WWAN device 104 to which to send the Tenant 1 QoS policy 206(1) and the Tenant1 URSP envelope 208(1) based on the SUPI for WWAN device 104 included in each URSP rule of the URSP envelope 208(1). In at least one embodiment, the Tenant1 QoS policy 206(1) and the Tenant1 URSP envelope 208(1) can be sent to the WWAN device 104 using a UE configuration update procedure. The UE configuration update procedure may be performed as prescribed at least by 3GPP TS 24.526, § 5.2 and 3GPP TS 23.502, § 4.2.4 for sending the URSP envelope 208(1) to the WWAN device 104. The WWAN device 104 can store the Tenant 1 QoS policy 206(1) and URSP envelope 208(1) via URSP storage 106, as generally shown at 233.

Consider, as shown at 234, that wireless device 114(1) (not shown) starts an application and sends a data packet to WLAN AP 112(1). The application may have an IP address of '1.1.1.1' such that the data packet may include a destination IP address (DA) set to '1.1.1.1'. As shown at 236, the WLAN AP 112(1) sends the data packet, via tunnel 109(1), to WWAN device 104.

Figure 2D:
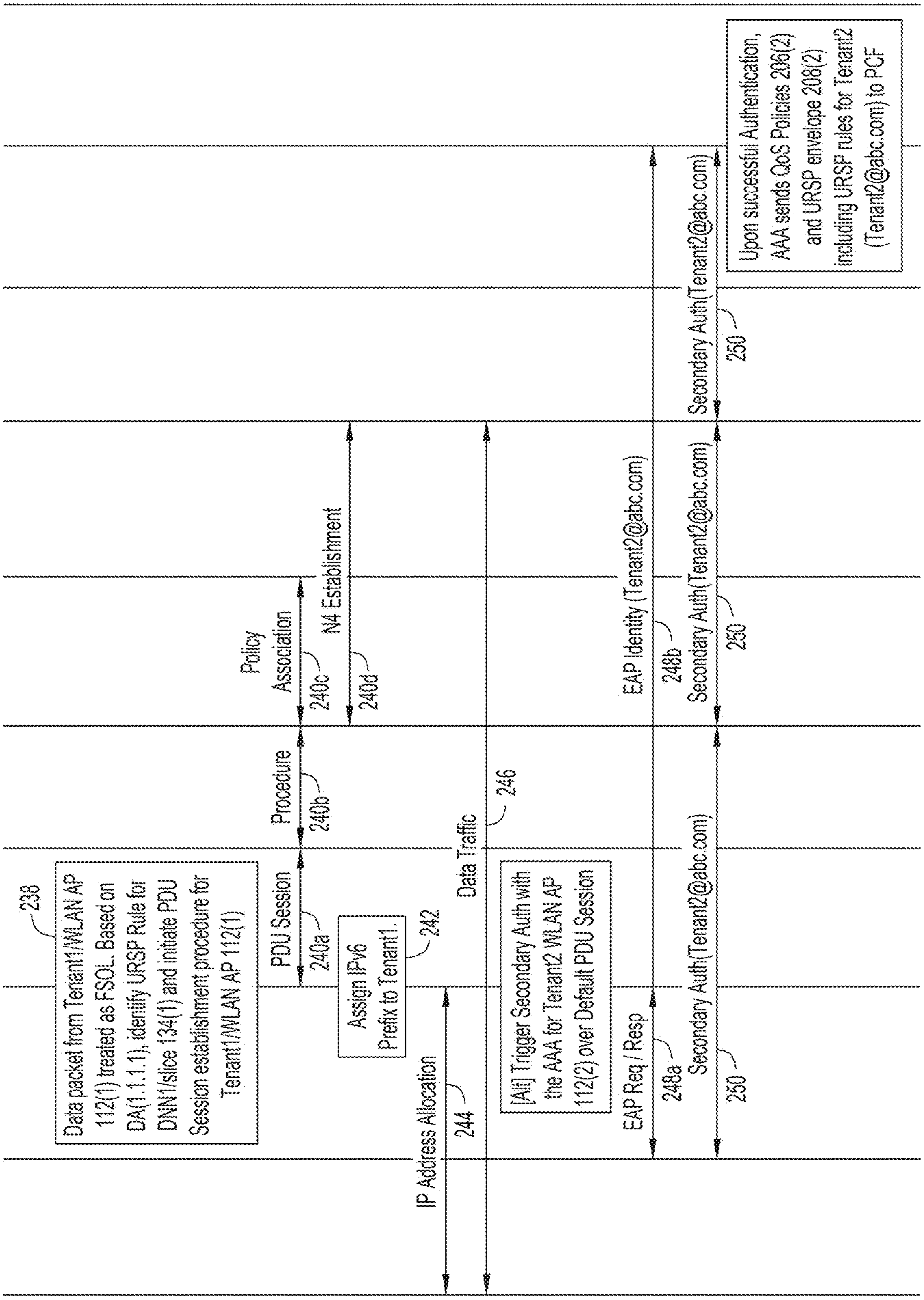

Moving to FIG. 2D, based on the WLAN AP to Tenant1 tunnel mapping maintained by WWAN device 104, the WWAN device 104 can determine, upon receiving the data packet at an ingress port mapped to the tunnel 109(1) established for WLAN AP 112(1), that the data packet is received for Tenant1. As shown at 238, the WWAN device 104 can treat the data packet as a FSOL for the Tenant1 WLAN AP 112(1), as no previous PDU sessions have been established for the Tenant1 WLAN AP 112(1). Further at 238, the WWAN device 104, based on the DA being set to '1.1.1.1', can identify/match the DA to the (first) URSP rule from the URSP envelope 208(1) that includes the traffic descriptor indicating address '1.1.1.1' and can initiate PDU session establishment for the Tenant1 WLAN AP 112(1) using the traffic descriptors included in the identified URSP rule, slice 134(1)/DNN1 (abc.com).

Recall, in some embodiments, the WWAN device 104 may use an FSOL data packet to trigger a secondary authentication process for a given tenant WLAN AP. Although not shown in FIG. 2C, in some embodiments, if not initiated by the WWAN device 104 prior to receiving the FSOL data packet, the WWAN device 104 can initiate a credential request/response exchange and cause a secondary authentication process to be performed between the Tenant1 WLAN AP 112(1) and the AAA 150 upon receiving the FSOL data packet, before initiating a PDU session for the Tenant1 WLAN AP 112(1) via the mobile core network 130.

Although destination address is discussed for the operations of FIGS. 2A, 2B, 2C, 2D, and 2E, it is to be understood that the traffic descriptor portion of a URSP rule configured for a URSP envelope of a given tenant can include any traffic descriptors, such as application descriptors, domain descriptors, non-IP descriptors, connection capabilities, and/or the like (e.g., service data flow (SDF) information, etc.) that WWAN device 104 can match to various elements/parameters of packet(s) received from a given tenant WLAN AP.

Returning to the present example, as shown at 240*a*, the WWAN device 104 performs a PDU session request/response exchange with AMF 142 regarding PDU session establishment for slice 134(1)/DNN1 (abc.com) involving Tenant1. The WWAN device 104 can send a PDU session request to the AMF 142 that includes the URSP indicated slice 134(1)/DNN1 (abc.com) and can include the tenant ID for Tenant1 (T-ID-1101). The AMF 142 selects an SMF, such as SMF 144, to handle the PDU session for Tenant1 based on the slice/DNN information included in the PDU session request and initiates a context procedure for Tenant1 (T-ID(1101)) via SMF 144, as generally shown at 240*b*, which triggers SMF 144, to retrieve subscription policies (PCC rules/information) from PCF 146 and create a policy association for Tenant1 (using T-ID(1101)), as generally shown at 240*c*.

The SMF 144 can also allocate an IPv6 prefix for a range/pool of IP addresses to be utilized for Tenant1 110(1) for data plane communications involving different wireless devices that may utilize the PDU session for Tenant1 110(1). In some embodiments, the SMF 144 can allocate an IPv6 prefix to Tenant1 in which the WWAN device 104 can determine different subnetwork ranges or subsets/pools of IP addresses from which to assign/allocate IP addresses to different wireless devices at the Tenant1 110(1) location (connected to WLAN AP 112(1)) that may be served using a given PDU session of multiple PDU sessions that can be established for Tenant1 110(1) (e.g., for each URSP rule included in the URSP envelope 208(1)). In some embodiments, the SMF 144 can allocate an IP prefix, along with different subnetwork ranges or subsets/pools of IP addresses that the WWAN device 104 is to use to assign/allocate IP addresses to different wireless devices at the Tenant1 110(1) location (connected to WLAN AP 112(1)) that may be served using a given PDU session of multiple PDU sessions that can be established for Tenant1 110(1).

As shown via 240*d*, the SMF 144, can select a UPF for the given network slice 134(1), such as UPF 132(1), to handle the PDU session for Tenant1 and can configure UPF 132(1), via an N4 session establishment exchange/process. In some embodiments, the SMF 144 may provide the UPF 132(1) with the identifier for Tenant1 110(1), such as the T-ID (1101), which the UPF 132(1) can utilize to identify traffic for Tenant1 110(1) for charging/billing purposes. In some embodiments, the SMF 144 can provide the IP prefix allocated to Tenant1 (and/or different subnetwork ranges or pools/ranges) to UPF 132(1), which the UPF 132(1) can use to identify traffic for different PDU session(s) established for Tenant1.

Through the PDU session establishment exchange at 226*a*, the SMF 144 can send a PDU session establishment accept message to the WWAN device 104 that includes the IPv6 prefix (and any other ranges/pools, if applicable) along with the Tenant1 tenant ID (T-ID(1101))

Obtaining the indication of successful PDU session establishment by the WWAN device 104 triggers the WWAN device 104, as generally shown at 242, to assign the IPv6 prefix to Tenant1 110(1) such that the tunnel mapping information can be updated for Tenant1 to include the IPv6 prefix allocated to Tenant1 and uplink (UL)/downlink (DL) forwarding rules can be configured for Tenant1 (e.g., indicating that UL packets received via the ingress port for tunnel 109(1)/Tenant1 are to be forwarded to the established PDU session associated with slice 134(1) and that DL packets received for Tenant1 are to be forwarded to WLAN AP 112(1) via the port for tunnel 109(1)/Tenant1).

As generally shown at 244, the WWAN device 104 can allocate/assign an IPv6 address to wireless device 114(1) from the IPv6 prefix address pool allocated by SMF 144 to Tenant1 for the PDU session. In at least one embodiment, the WWAN device 104 can perform a DHCP or Stateless Address Auto-configuration (SLAAC) process/exchange for the wireless device 114(1) via WLAN AP 112(1) in order to allocate the IPv6 address to the wireless device 114(1).

Thereafter, as generally shown at 244, data traffic for the established PDU session for Tenant1 involving slice 134(1)/UPF 132(1) can be exchanged in accordance with embodiments herein.

Although not shown in FIG. 2C, for any subsequent wireless device at the Tenant1 110(1) location that seeks to perform data communications for the given application/DA '1.1.1.1', the WWAN device 104 can determine that the PDU session associated with the DA is already established and can allocate/assign another IP address from the IPv6 pool to the subsequent wireless device(s) and utilize the established PDU session for any data communications involving the established PDU session.

Further, the WWAN device 104 can establish another PDU session for Tenant1 110(1)/WLAN AP 112(1) for any wireless device at the Tenant1 110(1) location that seeks to communicate traffic associated with DA '2.2.2.2' in which the PDU session can be established via slice 134(2)/DNN2 162(2) (mno.com) (and a corresponding UPF for the slice 134(2)) in accordance with the second URSP rule provided for the URSP envelope 208(1) upon receiving a first packet having a destination address set to '2.2.2.2', matching the corresponding URSP rule included in the URSP envelope 208(1) for Tenant1 110(1). The PDU session established via slice 134(2)/DNN2 162(2) can handle traffic for multiple wireless devices that may be present at the Tenant1 110(1) location that may send traffic towards the destination address '2.2.2.2'.

As further shown in FIG. 2D, the WWAN device 104 can also trigger a secondary authentication process to be performed via AAA 150 for Tenant2 WLAN AP 112(2), as shown at 246. In one embodiment, WWAN device 104 can trigger the secondary authentication process for WLAN AP 112(2) via an EAP identity request/response exchange with the WLAN AP 112(2) (via tunnel 109(2)), as shown at 248*a*, in which the WLAN AP 112(2) provides the NAI for the WLAN AP 112(2)/Tenant2, 'Tenant2@abc.com', which the WWAN device 104 can send to the AAA 150, as shown at 248*b*, to cause the secondary authentication process to be performed between the AAA 150 and the WLAN AP 112(2) using the NAI, as generally shown at 250.

Upon successful authentication of Tenant2/WLAN AP 112(2), the AAA 150 can send the Tenant2 QoS policy 206(2) (including the various configured QoS parameters) and the Tenant2 URSP envelope 208(2) (including the configured URSP rules) to the PCF 146, as shown at 252*a*, and the PCF 146 can provide the Tenant2 QoS policy 206(2) and the Tenant2 URSP envelope 208(2) to the UE/WWAN device 104, as shown at 252*b* and 252*c*. The PCF 146 can identify the UE/WWAN device 104 to which to send the Tenant2 QoS policy 206(2) and the Tenant2 URSP envelope 208(2) based on the SUPI for WWAN device 104 included in each URSP rule of the URSP envelope 208(2). In at least one embodiment, the Tenant2 QoS policy 206(2) and the Tenant2 URSP envelope 208(2) can be sent to the WWAN device 104 using a UE configuration update procedure. The WWAN device 104 can store the Tenant2 QoS policy 206(1) and URSP envelope 208(2) via URSP storage 106.

Figure 2E:
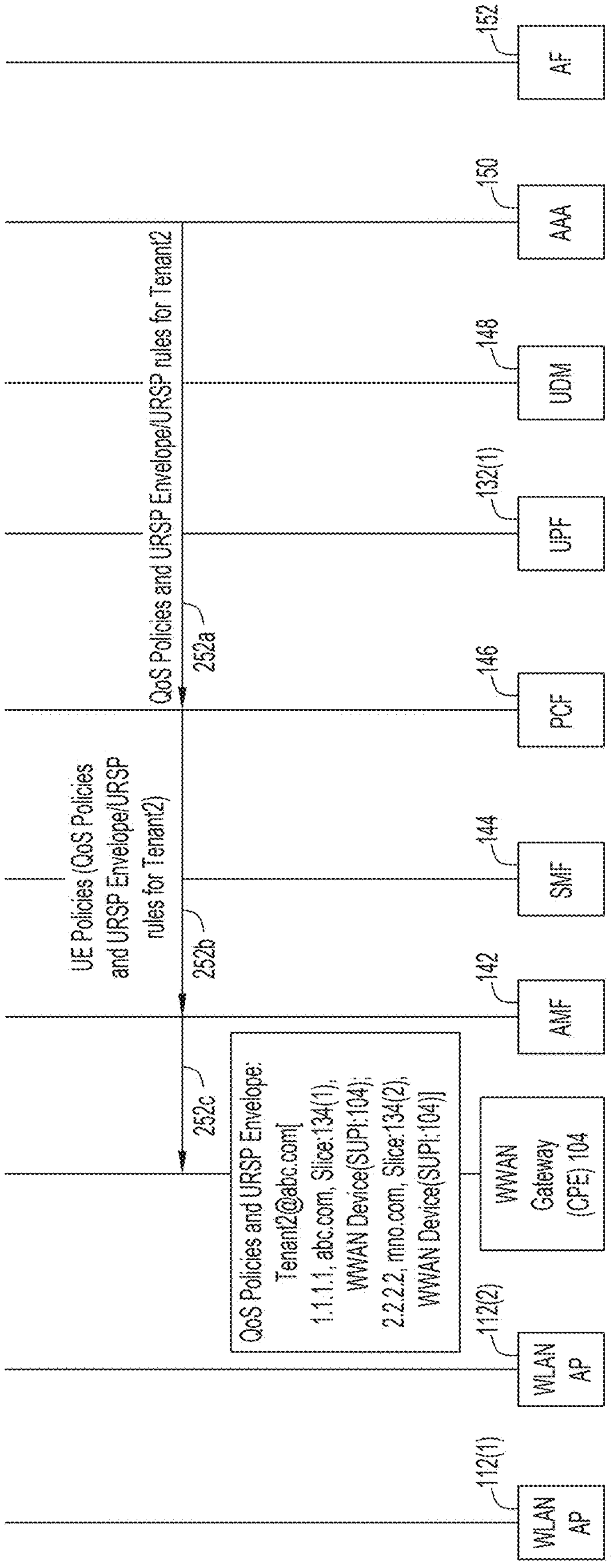

Although not shown in FIG. 2E, similar operations, such as establishing one or more PDU sessions for Tenant2 110(2)/WLAN AP 112(2) can be performed for Tenant2 110(2)/WLAN AP 112(2), using similar operations as discussed for Tenant1 110(1)/WLAN AP 112(1), based on the URSP rules contained in URSP envelope 208(2) for (first) packet(s) that may be received from WLAN AP 112(2). Further, it is to be understood that an FSOL data packet could also be used to cause the secondary authentication for the Tenant2 WLAN AP 112(2) in some embodiments.

Thus, as discussed through FIGS. 2A, 2B, 2C, 2D, and 2E, one or more per-tenant WWAN PDU sessions can be established for a tenant of a venue in accordance with URSP rules contained in a URSP envelope provided to a shared WWAN/5G/nG CPE device, such as shared WWAN device 104, that can serve any number of tenants and wireless devices located at the venue in accordance with embodiments herein. Further, any number of per-tenant WWAN PDU session(s) can be established for any number of tenants of a venue that may share access to a WWAN mobile core network through a shared WWAN/5G/nG CPE device, such as shared WWAN device 104, in accordance with URSP rules contained in each of a respective URSP envelope provided to a shared CPE device for each respective tenant. Data plane communications involving each of multiple tenants or, more specifically, any number of wireless devices served at each tenant location, can involve on-premise WLAN communications for the wireless devices (via WLAN AP(s) at each tenant location), wired communications between each of a given tenant WLAN AP and a shared, on-premise WWAN/5G/nG gateway, such as WWAN device 104, and WWAN (e.g., wireless 5G/nG/cellular) communications involving per-tenant PDU sessions.

FIGS. 2A, 2B, 2C, 2D, and 2E illustrate 3GPP signaling aspects/operations/constructs for providing clarity to various signaling aspects/operations. However, it is to be understood that non-3GPP signaling/operations/constructs could be utilized to perform similar operations for non-3GPP implementations, such as for private 5G/nG implementations. 3GPP aspects may be utilized to support different tenants/devices receiving QoS policies/parameters and URSP envelopes/rules per device/tenant.

Figure 3:
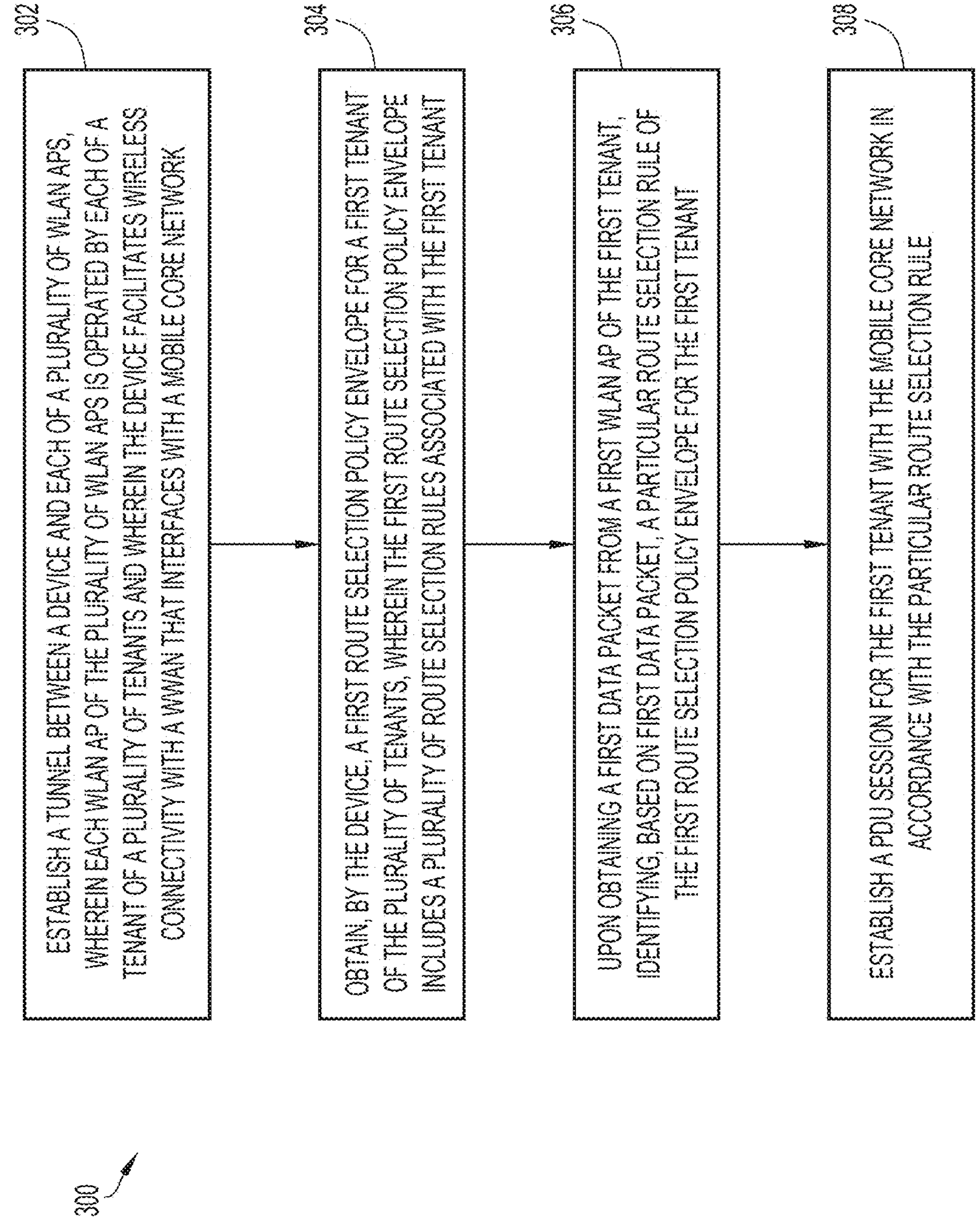
FIG. 3 is a flow chart depicting a method according to an example embodiment.

Referring to FIG. 3, FIG. 3 is a flow chart depicting a method 300 according to an example embodiment. In at least one embodiment, method 300 illustrates operations that may be performed by a shared WWAN gateway/device, such as WWAN device 104, that can be shared among multiple tenants for a venue in order to facilitate WWAN connectivity for the tenants with a mobile core network.

At 302, the method may include establishing a tunnel between a device (e.g., WWAN device 104) and each of a plurality of WLAN APs, wherein each WLAN AP of the plurality of WLAN APs is operated by each of a tenant of a plurality of tenants and wherein the device facilitates wireless connectivity with a wireless wide area network (WWAN) that interfaces with a mobile core network (e.g., WWAN 120/radio node 122 that interfaces with mobile core network 130).

At 304, the method may include obtaining, by the device, a first route selection policy envelope for a first tenant of the plurality of tenants, wherein the first route selection policy envelope includes a plurality of route selection rules associated with the first tenant.

At 306, the method may include, upon obtaining a first data packet from a first WLAN AP of the first tenant, identifying, based on first data packet, a particular route selection rule of the first route selection policy envelope for the first tenant.

At 308, the method may include establishing a PDU session for the first tenant with the mobile core network in accordance with the particular route selection rule.

Figure 4:
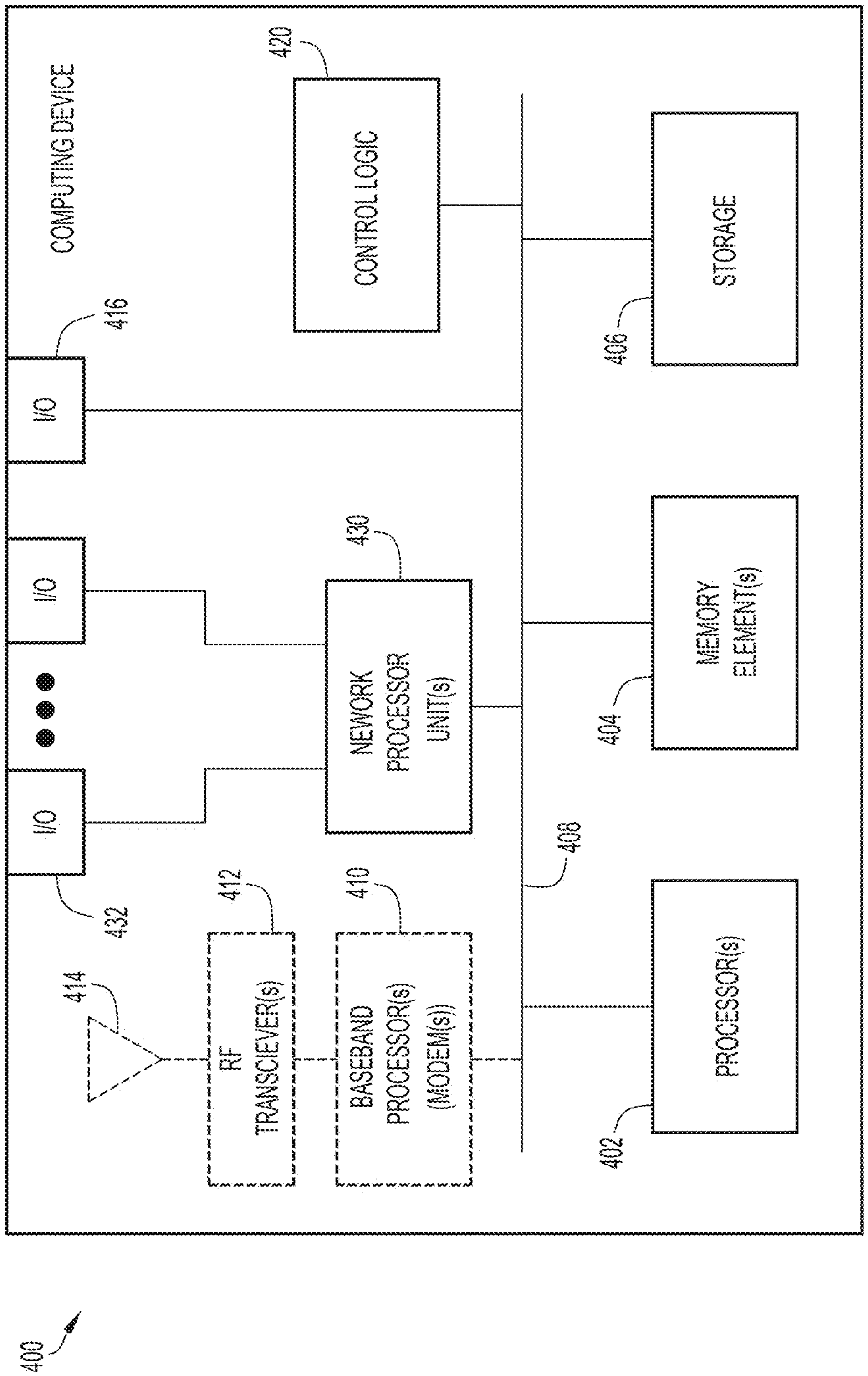
FIG. 4 illustrates a hardware block diagram of a computing device configured to perform functions associated with operations discussed in connection with embodiments herein.

Referring to FIG. 4, FIG. 4 illustrates a hardware block diagram of a computing device 400 that may perform functions associated with operations discussed herein in connection with the techniques described for embodiments herein. In various embodiments, a computing device or apparatus, such as computing device 400 or any combination of computing devices 400, may be configured as any entity/entities in order to perform operations of the various techniques discussed for embodiments herein, such as any elements, functions, etc. discussed for embodiments herein (e.g., WWAN device 104, WLAN AP 112(1), WLAN AP 112(2), wireless device 114(1), wireless device 114(2), AMF 142, SMF 144, PCF 146, UDM 148, AAA 150, AF 152, UPF 132(1), etc.).

In at least one embodiment, the computing device 400 may be any apparatus that may include one or more processor(s) 402, one or more memory element(s) 404, storage 406, a bus 408, one or more network processor unit(s) 430 interconnected with one or more network input/output (I/O) interface(s) 432, one or more I/O interface(s) 416, and control logic 420. In various embodiments, instructions associated with logic for computing device 400 can overlap in any manner and are not limited to the specific allocation of instructions and/or operations described herein.

For embodiments in which computing device 400 may be implemented as any device capable of wireless communications, such as WWAN and/or WLAN communications, computing device 400 may further include at least one baseband processor or modem 410, one or more radio RF transceiver(s) 412 (e.g., any combination of RF receiver(s) and RF transmitter(s)), one or more antenna(s) or antenna array(s) 414.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element (s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa) or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 430 may enable communication between computing device 400 and other systems, entities, etc., via network I/O interface(s) 432 (wired and/or wireless) to facilitate operations discussed for various embodiments described herein. In various embodiments, network processor unit(s) 430 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 432 can be configured as one or more Ethernet port(s), Fibre Channel ports, any other I/O port(s), and/or antenna(s)/antenna array(s) now known or hereafter developed. Thus, the network processor unit(s) 430 and/or network I/O interface(s) 432 may include suitable interfaces for receiving, transmitting, and/or otherwise communicating data and/or information (wired and/or wirelessly) in a network environment.

I/O interface(s) 416 allow for input and output of data and/or information with other entities that may be connected to computing device 400. For example, I/O interface(s) 416 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 400 is implemented as a wireless device or any apparatus capable of wireless communications, the RF transceiver(s) 412 may perform RF transmission and RF reception of wireless signals via antenna(s)/antenna array(s) 414, and the baseband processor or modem 410 performs baseband modulation and demodulation, etc. associated with such signals to enable wireless communications for computing device 400.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element (s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may facilitate on-premise wireless wide area access network equipment sharing in a multi-tenant environment. In one form, a computer-implemented method is provided that may include establishing a tunnel between a device and each of a plurality of wireless local area network (WLAN) access points (APs), wherein each WLAN AP of the plurality of WLAN APs is operated by each of a tenant of a plurality of tenants and wherein the device facilitates wireless connectivity with a wireless wide area network (WWAN) that interfaces with a mobile core network; obtaining, by the device, a first route selection policy envelope for a first tenant of the plurality of tenants, wherein the first route selection policy envelope includes a plurality of route selection rules associated with the first tenant; upon obtaining a first data packet from a first WLAN AP of the first tenant, identifying, based on first data packet, a particular route selection rule of the first route selection policy envelope for the first tenant; and establishing a protocol data unit (PDU) session for the first tenant with the mobile core network in accordance with the particular route selection rule. The device has a wired connection with each of WLAN AP of the plurality of WLAN APs.

In one instance, the first route selection policy envelope for the first tenant is a first user equipment (UE) route selection policy (URSP) envelope for the first tenant and the plurality of route selection rules associated with the first tenant are a plurality of URSP rules associated with the first tenant.

In one instance, the method may include, before obtaining the first route selection policy envelope for the first tenant of the plurality of tenants, performing, by the device, a registration with the mobile core network; and obtaining, by the device, a user equipment (UE) route selection policy (URSP) envelope for the device, wherein the URSP envelope for the device includes a default URSP rule for the device.

In one instance, the method may include establishing, by the device, a default protocol data unit (PDU) session with the mobile core network. In one instance, the default PDU session is established via a network slice of the mobile core network that is identified in the default URSP rule for the device. In one instance, the method may further include causing, by the device, the first WLAN AP of the first tenant to perform an authentication with an authentication server of the mobile core network, wherein the authentication is performed using the default PDU session established by the device. In one instance, the first route selection policy envelope for the first tenant is obtained by the device from the authentication server upon successful authentication of the first WLAN AP of the first tenant by the authentication server.

In one instance, the method includes, upon successful authentication of the first WLAN AP of the first tenant by the authentication server, obtaining, by the device from the authentication server, one or more quality of service parameters for the first tenant.

In one instance, the identifying includes identifying one or more elements or parameters of the first packet that match at least one traffic descriptor included in the particular route selection rule of the first route selection policy envelope for the first tenant.

In one instance, the method includes obtaining, by the device, at least one second route selection policy envelope for at least one second tenant of the plurality of tenants, wherein the at least one second route selection policy envelope includes a plurality of route selection rules associated with the at least one second tenant; upon obtaining a first data packet from at least one second WLAN AP of the at least one second tenant, identifying, based on the first data packet, a particular route selection rule of the at least one second route selection policy envelope for the at least one tenant; and establishing a protocol data unit (PDU) session for the at least one second tenant with the mobile core network in accordance with the particular route selection rule.

Accordingly, embodiments herein provide for the ability to support 5G/nG/cellular connectivity/services for multiple tenants behind a shared 5G/nG/cellular on-premise device having a wired connection with WLAN APs provided for each of multiple tenants, such as shared WWAN device 104. Embodiments herein further provide for the ability to dynamically on-board/authenticate devices behind the on-premise device (e.g., on the wired side of the device), with a distinct charging ID and a tenant specific service offering provided on a per-tenant basis to the multiple tenants sharing the on-premise device. Thus, service activation for utilizing a WWAN device, such as WWAN device 104, by a given tenant/WLAN AP can be based on successful authentication via an AAA server.

Thus, embodiments herein may broadly facilitate providing a mobile network operator specific AAA server, such as AAA 150, that can be configured with URSPs for the devices/tenants (e.g., WLAN AP(s)) that connect behind a shared 5G/nG/cellular UE/CPE, such as WWAN device 104. The shared 5G UE/CPE (WWAN device 104) can register with a mobile core network and establish a default PDU session with the mobile core network. When a tenant/device, such as a WLAN AP of a tenant, connects to the shared 5G/nG/cellular UE/CPE (WWAN device 104), a secondary authentication can be triggered by the shared 5G/nG/cellular UE/CPE/WWAN device 104 with the AAA 150 server, such as AAA 150.

After successful authentication of a given tenant WLAN AP, the AAA 150 can provide a QoS policies/parameters and URSP rules (via corresponding URSP envelope) applicable to the given tenant/WLAN AP to a PCF, such as PCF 146, and the PCF 146 can provide the tenant QoS policies/parameters and URSP rules to the shared 5G/nG/cellular UE/CPE/WWAN device 104 for the given tenant. When a user/device connected to the tenant WLAN AP starts an application, parameters (e.g., destination address, etc.) of a packet sent via the WLAN AP to the shared 5G/nG/cellular UE/CPE/WWAN device 104, the 5G/nG/cellular UE/CPE/WWAN device 104 can determine an applicable URSP to use to trigger PDU session establishment for the tenant WLAN AP. Other operations can be performed in accordance with embodiments herein.

Accordingly, embodiments herein may provide for bringing tenant specific policies and giving a multi-user/tenant color to a single SIM device, such as WWAN device 104, which may allow mobile network operators to explore new business models. In particular, embodiments herein may provide for using a single CPE box with a single SIM, such as WWAN device 104, through which multiple mobile network subscriptions can be sold to each of multiple (wired) tenants that can share the WWAN device 104 for wireless connectivity with a 5G/nG/cellular mobile network.

By bringing tenant identification and authentication, bringing PDU coloring semantics may provide a starting point for enabling multi-tenancy using such a shared WWAN device. By providing for the ability to use multiple URSP policies/envelopes (per-tenant, containing multiple URSP rules) for a single SIM, providing logic to facilitate delivery of the URSP policies to a shared 5G/nG/cellular UE/CPE/WWAN device, providing logic for binding a URSP envelope/rules to a tenant ID, providing logic for linking URSP policies/rules to per-tenant authentication, and enforcing the URSP policies on the same 5G/nG/cellular UE/CPE/WWAN device, embodiments herein facilitate providing multi-tenant policy support for an environment in which multiple tenants may utilize a shared 5G/nG/cellular UE/CPE/WWAN device to connect with and communicate traffic via a 5G/nG/cellular mobile network.

Variations and Implementations

Generally, per-3GPP standards for a mobile core network, an AMF interfaces with a SMF which can further interface with one or more UPFs. An AMF and an SMF can further interface with PCF, a UDM/UDR, and various other core network functions via 3GPP Service-Based Interface (SBI) constructs/interfaces and/or any other 3GPP interfaces/reference points. An AMF and a UPF can further interface with a RAN node, such as one or more gNBs or disaggregated components thereof.

One or more wireless device sessions, often referred to as PDU sessions can be established between a wireless device and a UPF for a core network in which the session may be facilitated/managed by an SMF, as is generally understood in the art.

Generally, a radio access may include one or more radio access network (RAN) radio nodes that may implement a wireless wide area (WWA) (e.g., cellular) air interface and, in some instances also a wireless local area (WLA) (e.g., Wi-Fi®) air interface, for any combination of Radio Access Technology (RAT) types (e.g., 'accesses'), such as 3GPP WWA licensed spectrum accesses (e.g., Fourth Generation/Long Term Evolution (4G/LTE), 5G/New Radio (NR) accesses); 3GPP unlicensed spectrum accesses (e.g., Licensed-Assisted Access (LAA), enhanced LAA (LAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, a WWAN RAN radio node may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like)), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more wireless devices (e.g., WWAN device 104), may utilize to connect for one or more sessions (e.g., voice/IMS, data/internet (e.g., video, gaming, etc.), combinations thereof, etc.).

A wireless device, such as any of wireless device 114(1)/114(2), WWAN device 104, or any other wireless devices discussed herein, may be considered any electronic device, etc. that initiates a connection or communication session with a corresponding core network, and may be inclusive of but not limited to a computer, a mobile phone or mobile communication device, an electronic tablet, a laptop, etc., an electronic device such as an industrial device (e.g., a robot), automation device, enterprise device, appliance, Internet of Things (IOT) device, a router or gateway with a WWA interface (e.g., WWAN device 104), a WWA/WLA (cellular/Wi-Fi®) enabled device, and/or any other device, component, element, or object capable of initiating voice, audio, video, media, or data exchanges within a system. Thus, a wireless device may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of one or more RAN(s).

Generally, an AMF may facilitate access and mobility management control/services for one or more wireless devices seeking connection to/connected to a mobile core network. Generally, an SMF may be responsible for wireless device session management, with individual functions/services being supported on a per-session basis in order to facilitate data transfer(s) between a wireless device and one or more networks via one or more UPFs. Generally, a UPF may operate to provide packet routing and forwarding operations for user data traffic and may also perform a variety of functions such as packet inspection, traffic optimization, Quality of Service (QoS), policy enforcement and user data traffic handling (e.g., to/from one or more data networks), billing operations (e.g., accounting, etc.), among other operations, for wireless device sessions. Typically, a UDM stores subscription data (typically in combination with a UDR) for subscribers (e.g., a user that may be associated with a given wireless device) that can be retrieved and/or otherwise obtained/utilized during operation of a core network system. Typically, a PCF stores policy data in order to provide policy control services (e.g., to facilitate access control for one or more UEs, such as WWAN device 104, network selection, etc.). Typically, a charging function (CHF) provides support for charging services such as facilitating the transfer of policy counter information associated with subscriber (e.g., UE) spending limits, etc.

In general, authentication services may include authenticating and/or authorizing one or more device(s) for one or more connections and/or communications and may be inclusive of any Authentication, Authorization, and Accounting (AAA) services that may be facilitated via any combination of authentication/authorization protocols such as Remote Authentication Dial-In User Service (RADIUS), DIAMETER, Extensible Authentication Protocol (EAP) [including any EAP variations], and/or the like. Generally, authentication refers to a process in which an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

establishing a tunnel between a device and each of a plurality of wireless local area network (WLAN) access points (APs), wherein each WLAN AP of the plurality of WLAN APs is operated by each of a tenant of a plurality of tenants and wherein the device facilitates wireless connectivity with a wireless wide area network (WWAN) that interfaces with a mobile core network;

performing, by the device, a registration with the mobile core network;

obtaining, by the device, a default route selection policy envelope for the device, wherein the default route selection policy envelope for the device includes a default route selection rule for the device;

obtaining, by the device, a first route selection policy envelope for a first tenant of the plurality of tenants, wherein the first route selection policy envelope includes a plurality of route selection rules associated with the first tenant;

upon obtaining a first data packet from a first WLAN AP of the first tenant, identifying, based on the first data packet, a particular route selection rule of the first route selection policy envelope for the first tenant; and establishing a protocol data unit (PDU) session for the first tenant with the mobile core network in accordance with the particular route selection rule.

2. The method of claim 1, wherein the device has a corresponding wired connection with each WLAN AP of the plurality of WLAN APs.

3. The method of claim 1, wherein the first route selection policy envelope for the first tenant is a first user equipment (UE) route selection policy (URSP) envelope for the first tenant and the plurality of route selection rules associated with the first tenant are a plurality of URSP rules associated with the first tenant.

4. The method of claim 1, further comprising:

establishing, by the device, a default protocol data unit (PDU) session with the mobile core network.

5. The method of claim 4, wherein the default route selection policy envelope for the device is a default user equipment (UE) route selection policy (URSP) envelope for the device and the default route selection rule for the device is a default URSP rule for the device and wherein the default PDU session is established via a network slice of the mobile core network that is identified in the default URSP rule for the device.

6. The method of claim 4, further comprising:
causing, by the device, the first WLAN AP of the first tenant to perform an authentication with an authentication server of the mobile core network, wherein the authentication is performed using the default PDU session established by the device.

7. The method of claim 6, wherein the first route selection policy envelope for the first tenant is obtained by the device from the authentication server upon successful authentication of the first WLAN AP of the first tenant by the authentication server.

8. The method of claim 7, further comprising:
upon successful authentication of the first WLAN AP of the first tenant by the authentication server, obtaining, by the device from the authentication server, one or more quality of service parameters for the first tenant.

9. The method of claim 1, wherein the identifying includes:
identifying one or more elements or parameters of the first data packet that match at least one traffic descriptor included in the particular route selection rule of the first route selection policy envelope for the first tenant.

10. The method of claim 1, further comprising:
obtaining, by the device, at least one second route selection policy envelope for at least one second tenant of the plurality of tenants, wherein the at least one second route selection policy envelope includes a plurality of route selection rules associated with the at least one second tenant;
upon obtaining a first data packet from at least one second WLAN AP of the at least one second tenant, identifying, based on the first data packet, a particular route selection rule of the at least one second route selection policy envelope for the at least one second tenant; and
establishing a protocol data unit (PDU) session for the at least one second tenant with the mobile core network in accordance with the particular route selection rule.

11. The method of claim 1, wherein the default route selection policy envelope for the device is a default user equipment (UE) route selection policy (URSP) envelope for the device and the default route selection rule for the device is a default URSP rule for the device.

12. One or more non-transitory computer readable storage media encoded with instructions that, when executed by a processor, cause the processor to perform operations, comprising:
establishing a tunnel between a device and each of a plurality of wireless local area network (WLAN) access points (APs), wherein each WLAN AP of the plurality of WLAN APs is operated by each of a tenant of a plurality of tenants and wherein the device facilitates wireless connectivity with a wireless wide area network (WWAN) that interfaces with a mobile core network;
performing, by the device, a registration with the mobile core network;
obtaining, by the device, a default route selection policy envelope for the device, wherein the default route selection policy envelope for the device includes a default route selection rule for the device;
obtaining, by the device, a first route selection policy envelope for a first tenant of the plurality of tenants, wherein the first route selection policy envelope includes a plurality of route selection rules associated with the first tenant;
upon obtaining a first data packet from a first WLAN AP of the first tenant, identifying, based on the first data packet, a particular route selection rule of the first route selection policy envelope for the first tenant; and
establishing a protocol data unit (PDU) session for the first tenant with the mobile core network in accordance with the particular route selection rule.

13. The media of claim 12, wherein the first route selection policy envelope for the first tenant is a first user equipment (UE) route selection policy (URSP) envelope for the first tenant and the plurality of route selection rules associated with the first tenant are a plurality of URSP rules associated with the first tenant.

14. The media of claim 12, wherein the default route selection policy envelope for the device is a default user equipment (UE) route selection policy (URSP) envelope for the device and the default route selection rule for the device is a default URSP rule for the device and wherein the instructions, when executed by the processor, cause the processor to perform further operations, comprising:
establishing, by the device, a default protocol data unit (PDU) session with the mobile core network.

15. The media of claim 14, wherein the default PDU session is established via a network slice of the mobile core network that is identified in the default URSP rule for the device.

16. An apparatus comprising:
at least one memory element for storing data; and
at least one processor for executing instructions associated with the data, wherein executing the instructions causes the apparatus to perform operations, comprising:
establishing a tunnel between the apparatus and each of a plurality of wireless local area network (WLAN) access points (APs), wherein each WLAN AP of the plurality of WLAN APs is operated by each of a tenant of a plurality of tenants and wherein the apparatus facilitates wireless connectivity with a wireless wide area network (WWAN) that interfaces with a mobile core network;
performing a registration with the mobile core network;
obtaining a default route selection policy envelope for the apparatus, wherein the default route selection policy envelope for the apparatus includes a default route selection rule for the apparatus;
obtaining a first route selection policy envelope for a first tenant of the plurality of tenants, wherein the first route selection policy envelope includes a plurality of route selection rules associated with the first tenant;
upon obtaining a first data packet from a first WLAN AP of the first tenant, identifying, based on the first data packet, a particular route selection rule of the first route selection policy envelope for the first tenant; and
establishing a protocol data unit (PDU) session for the first tenant with the mobile core network in accordance with the particular route selection rule.

17. The apparatus of claim 16, wherein the apparatus has a corresponding wired connection with each WLAN AP of the plurality of WLAN APs.

18. The apparatus of claim 16, wherein the first route selection policy envelope for the first tenant is a first user equipment (UE) route selection policy (URSP) envelope for the first tenant and the plurality of route selection rules associated with the first tenant are a plurality of URSP rules associated with the first tenant.

19. The apparatus of claim 16, wherein the default route selection policy envelope for the apparatus is a default user equipment (UE) route selection policy (URSP) envelope for the apparatus and the default route selection rule for the apparatus is a default URSP rule for the apparatus and wherein executing the instructions causes the apparatus to perform further operations, comprising:

establishing a default protocol data unit (PDU) session with the mobile core network.

20. The apparatus of claim 19, wherein the default PDU session is established via a network slice of the mobile core network that is identified in the default URSP rule for the apparatus.

* * * * *